Sept. 14, 1937.   A. REIDINGER   2,093,389
STEAM LOCOMOTIVE
Filed Aug. 2, 1935   19 Sheets-Sheet 1

INVENTOR
Albert Reidinger
BY
ATTORNEY

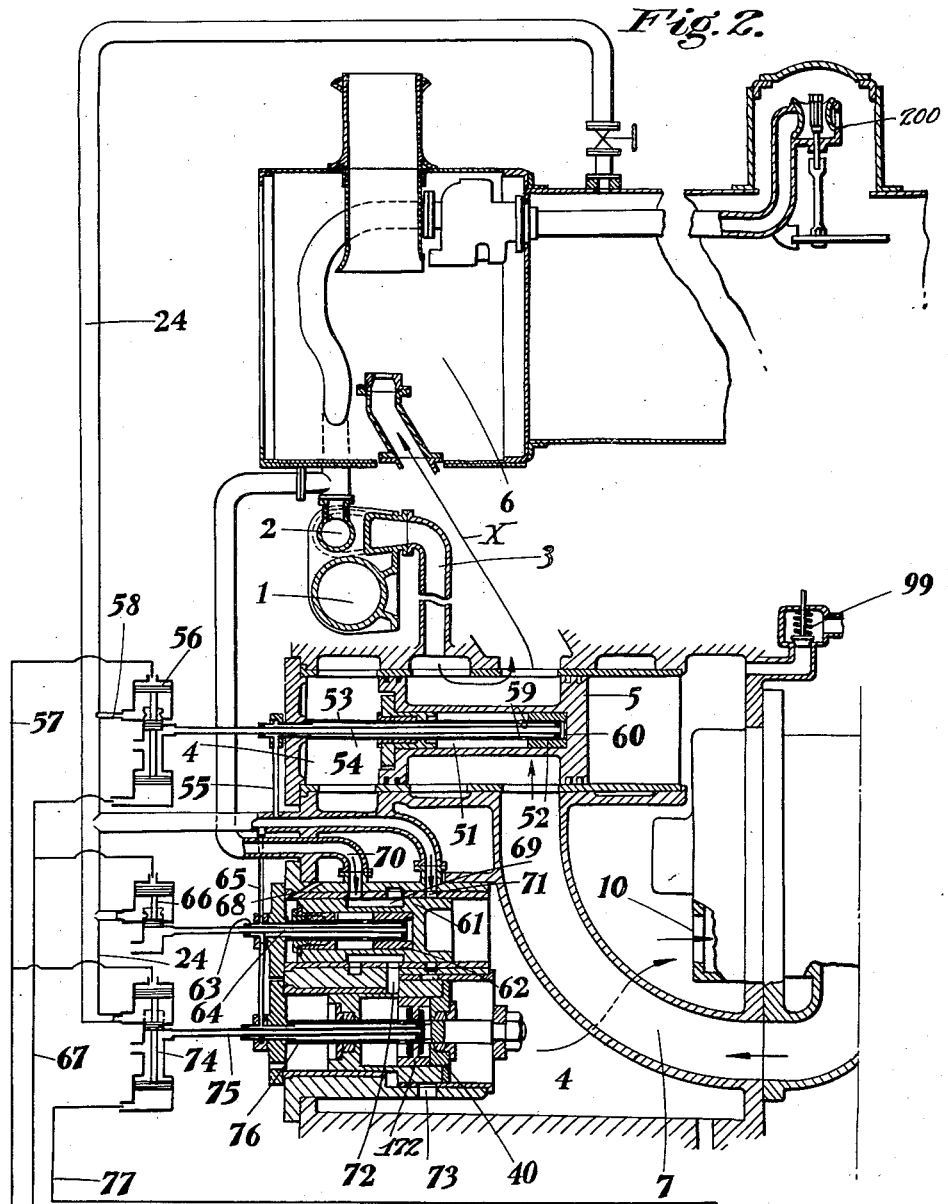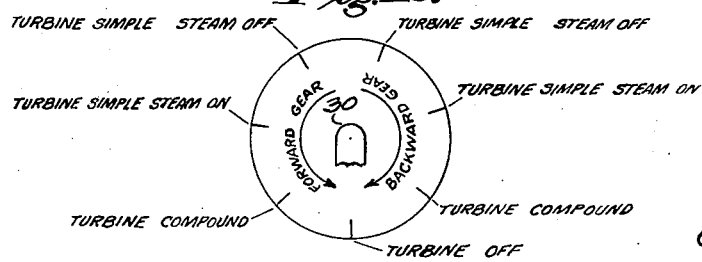

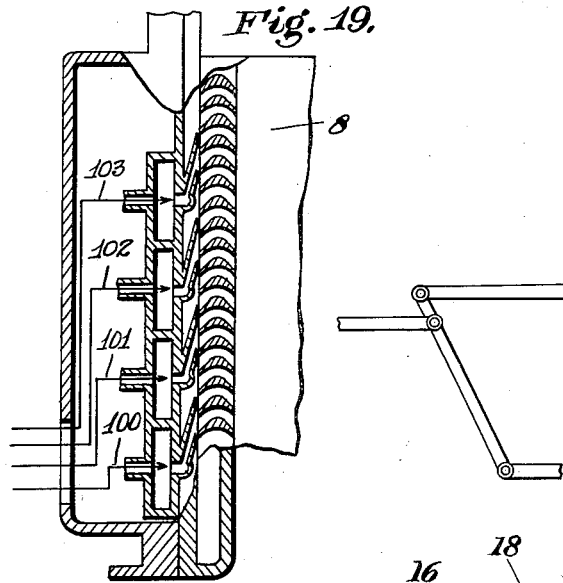
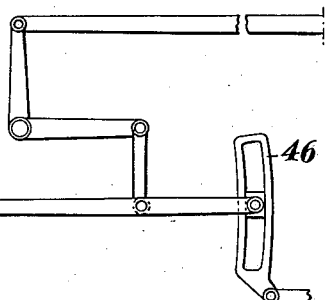
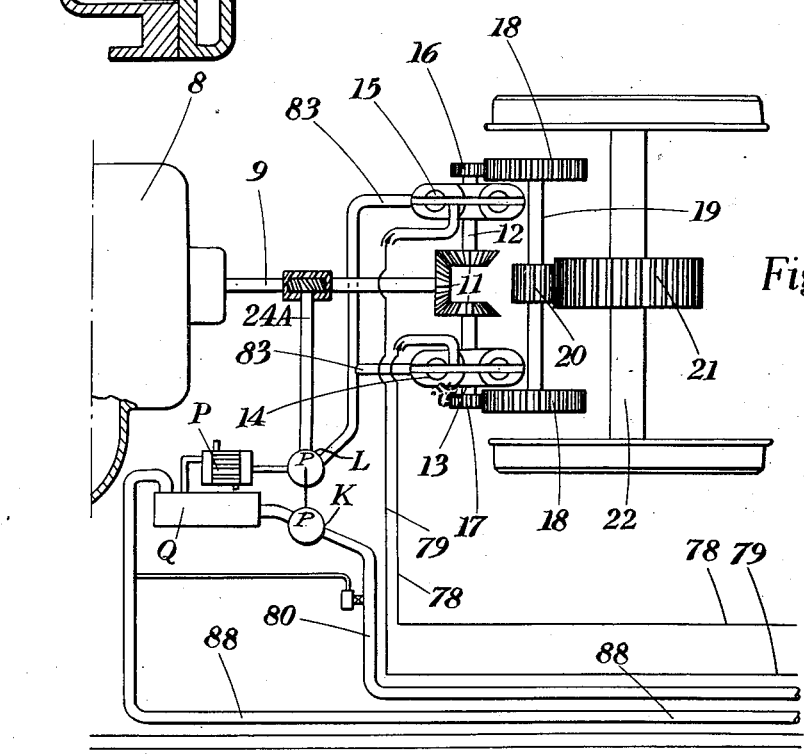

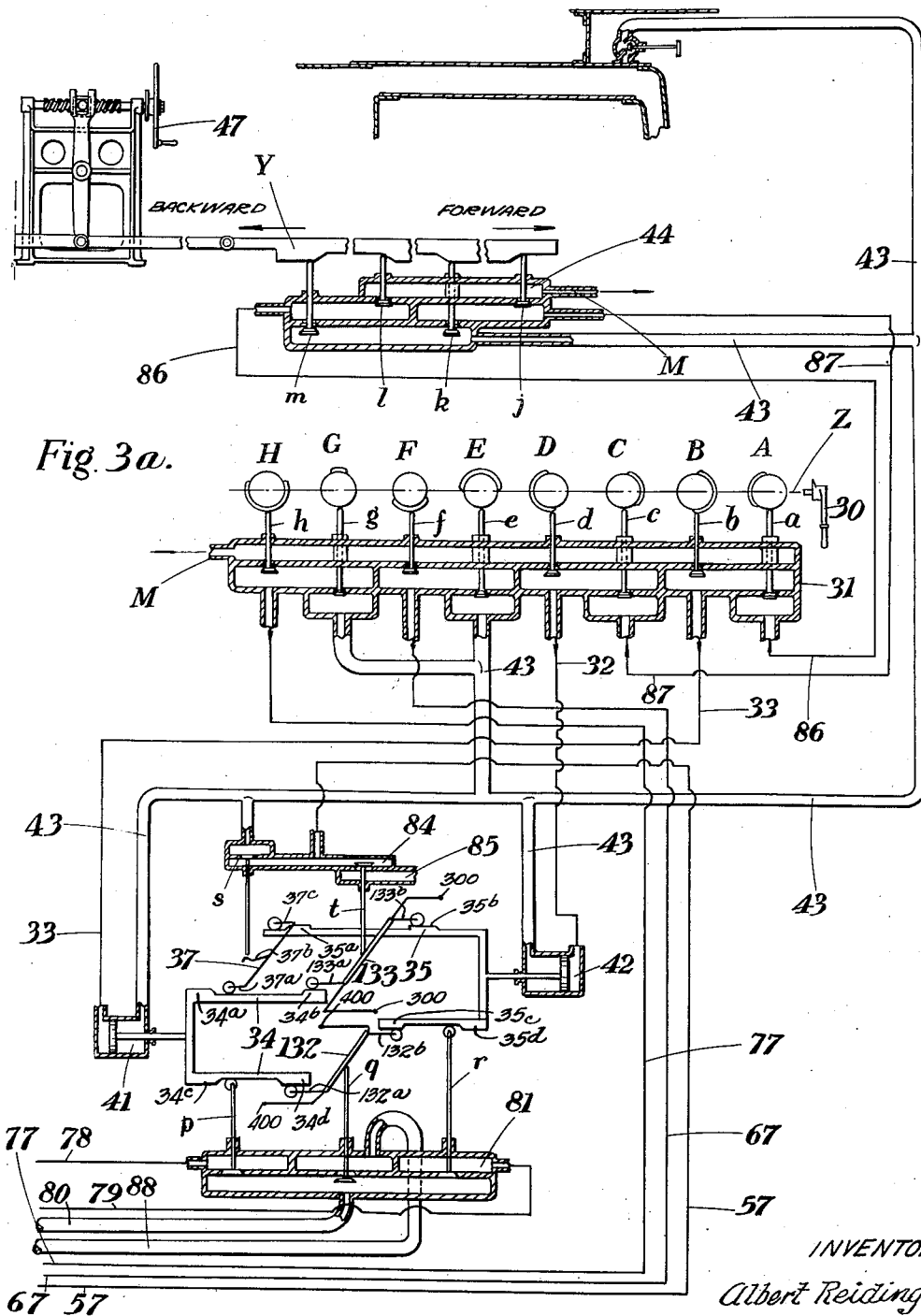

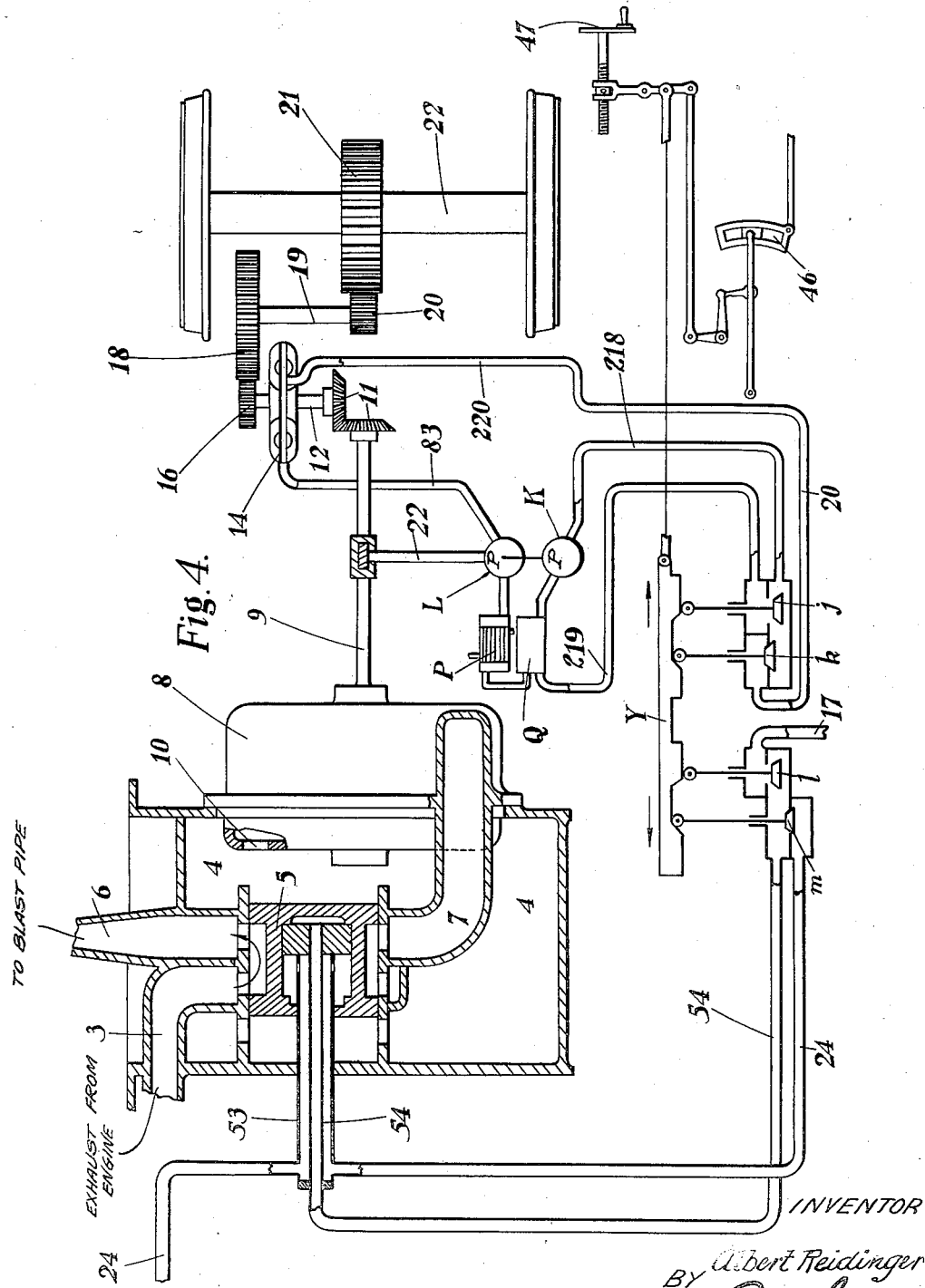

Sept. 14, 1937.　　　A. REIDINGER　　　2,093,389
STEAM LOCOMOTIVE
Filed Aug. 2, 1935　　　19 Sheets-Sheet 6

INVENTOR.
Albert Reidinger
BY
ATTORNEY

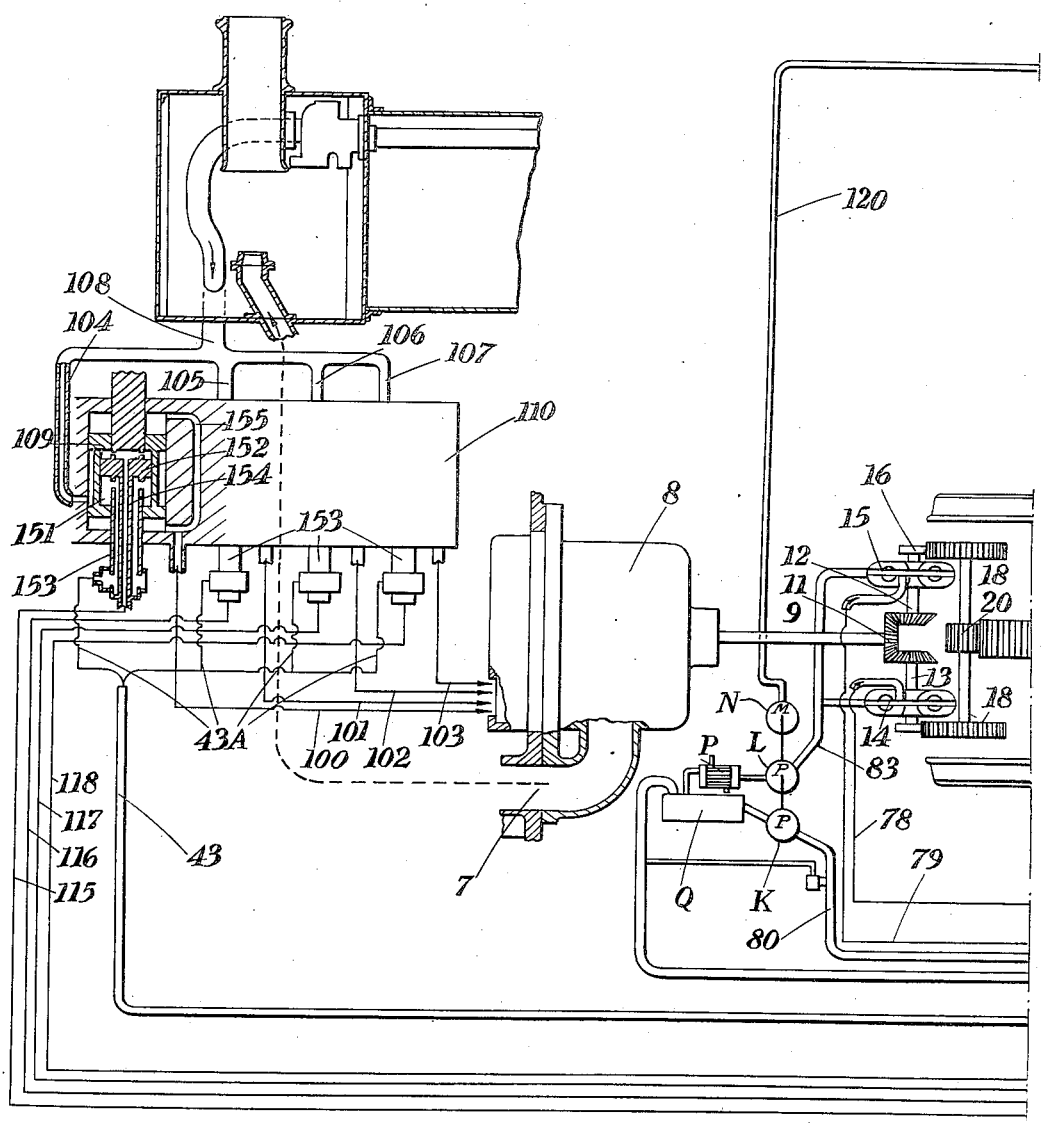

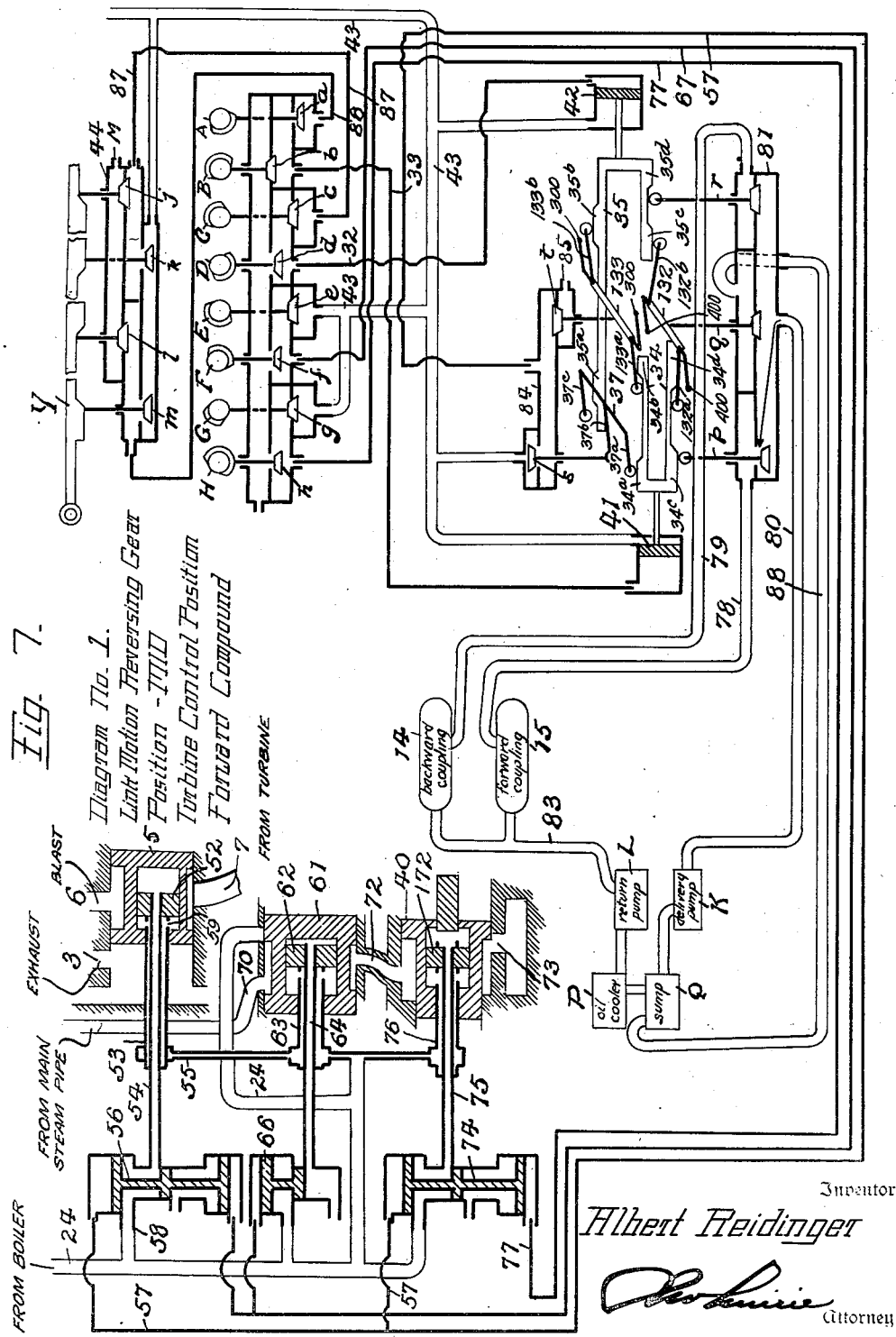

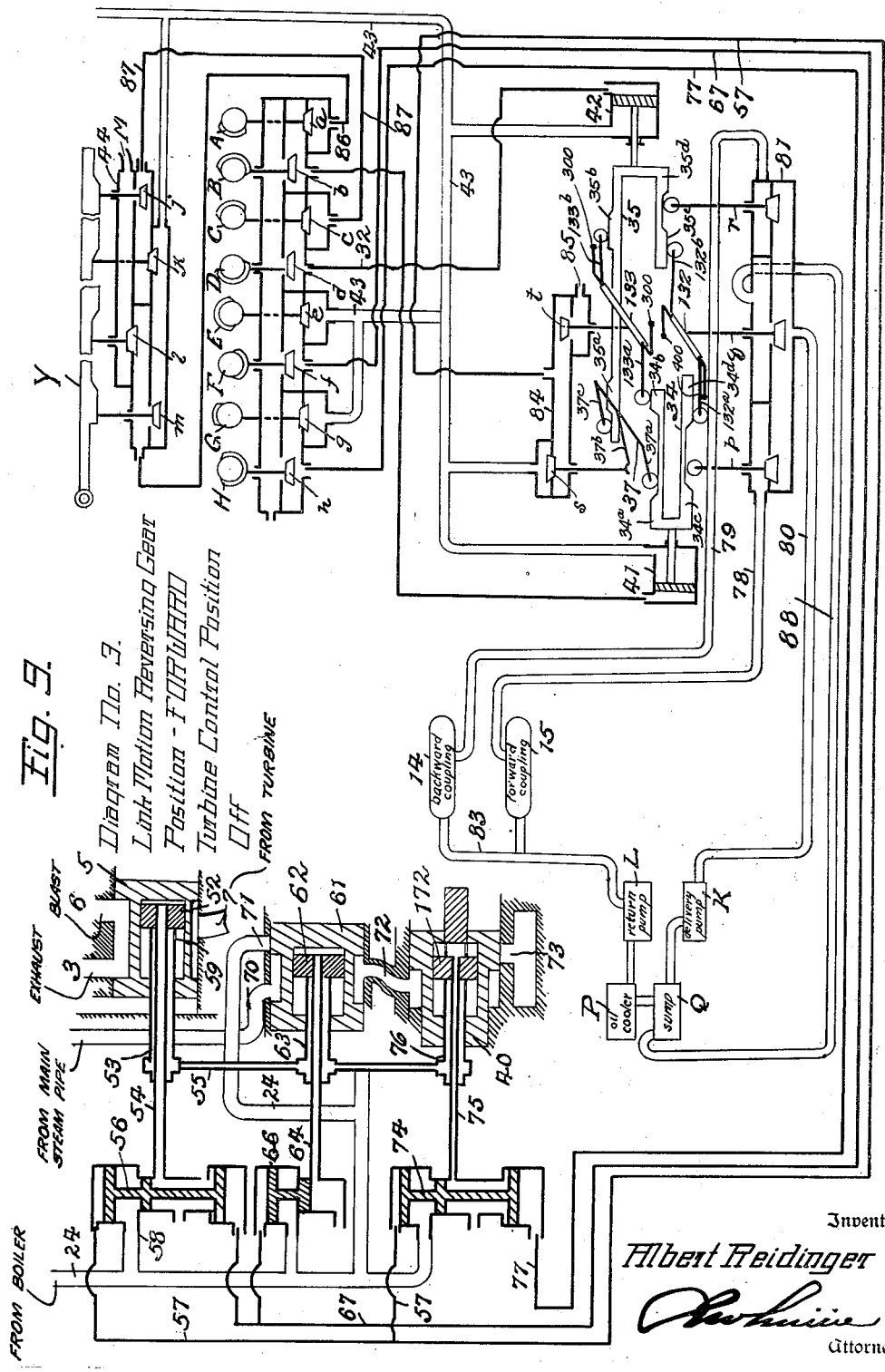

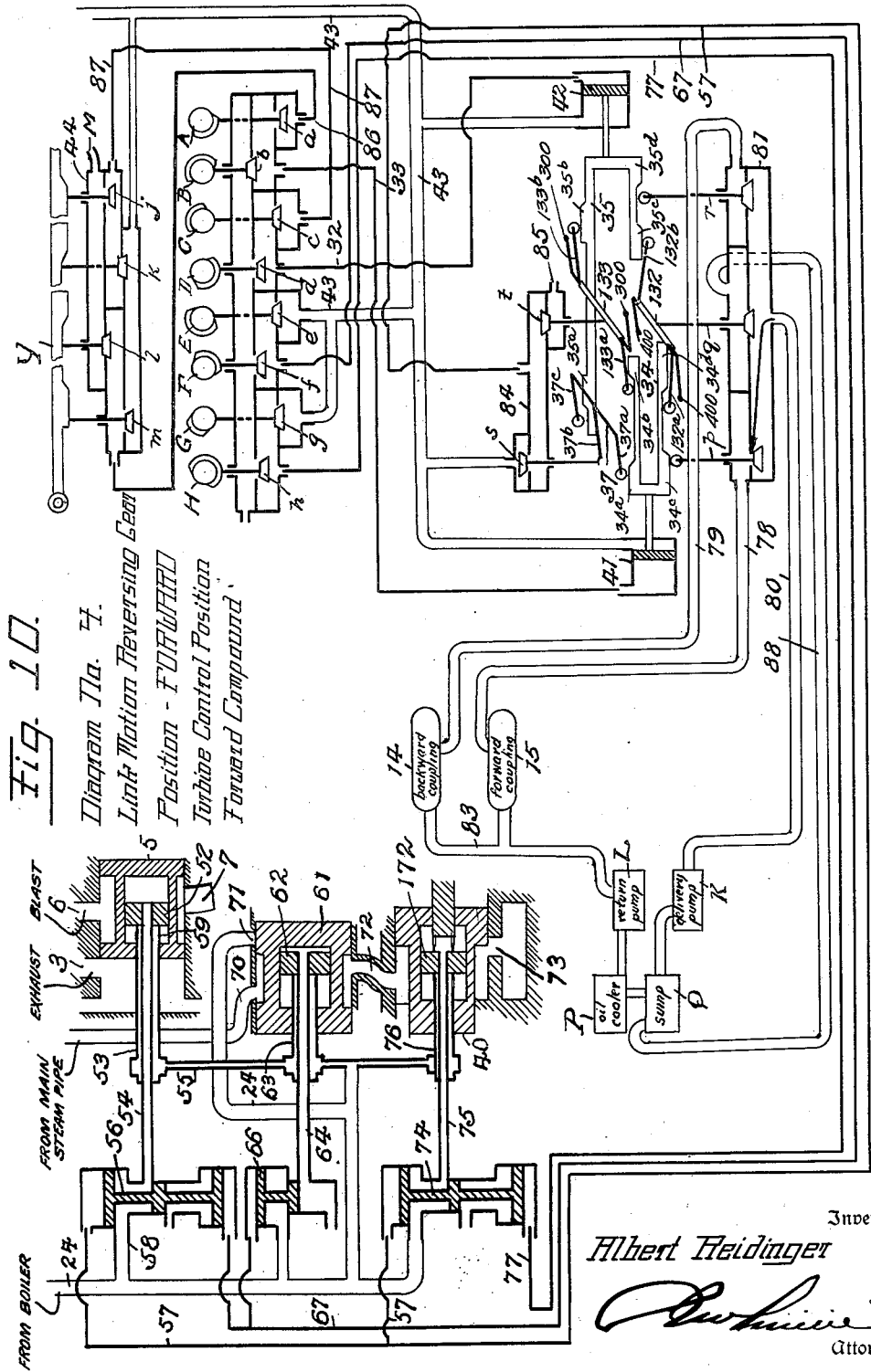

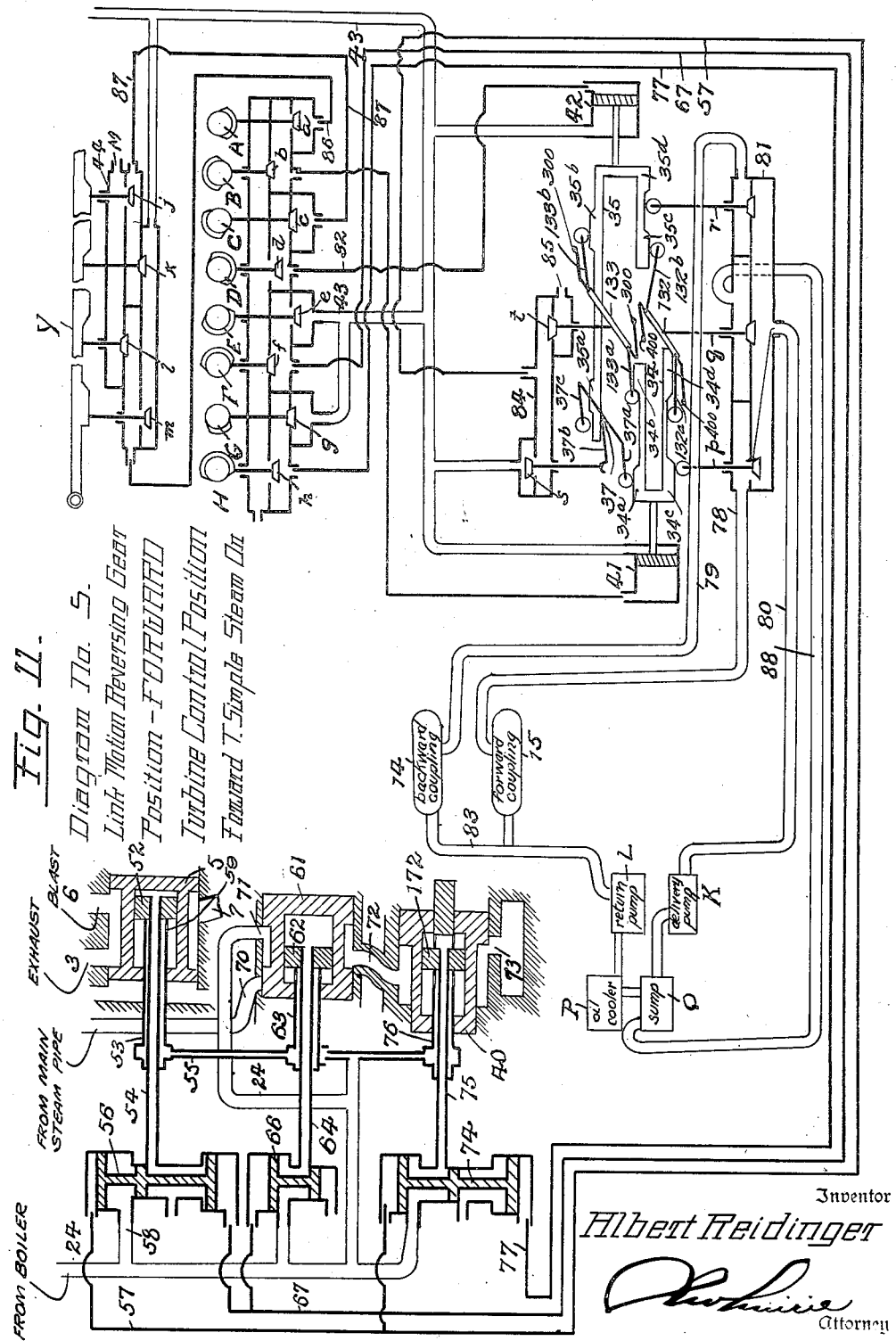

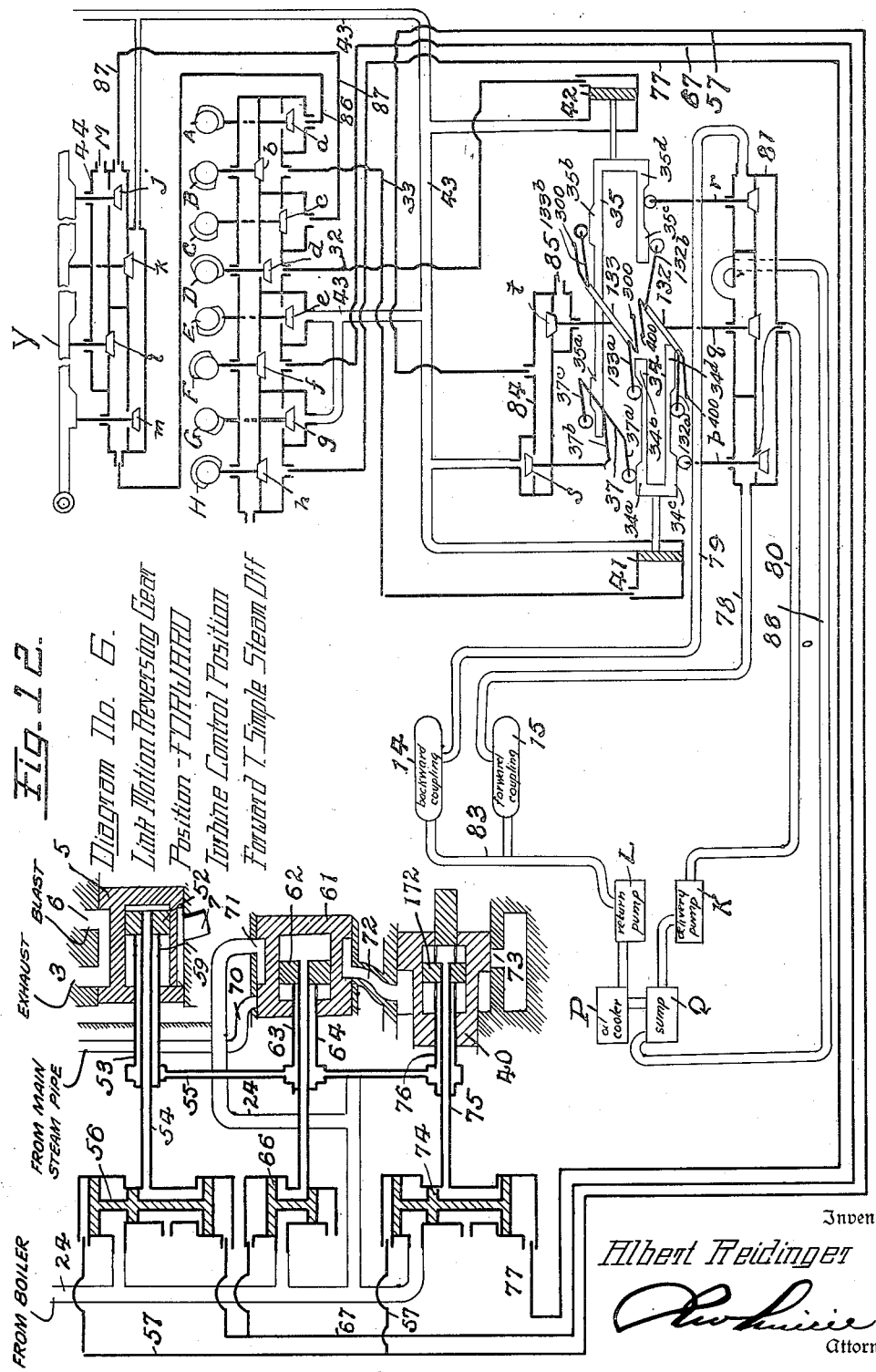

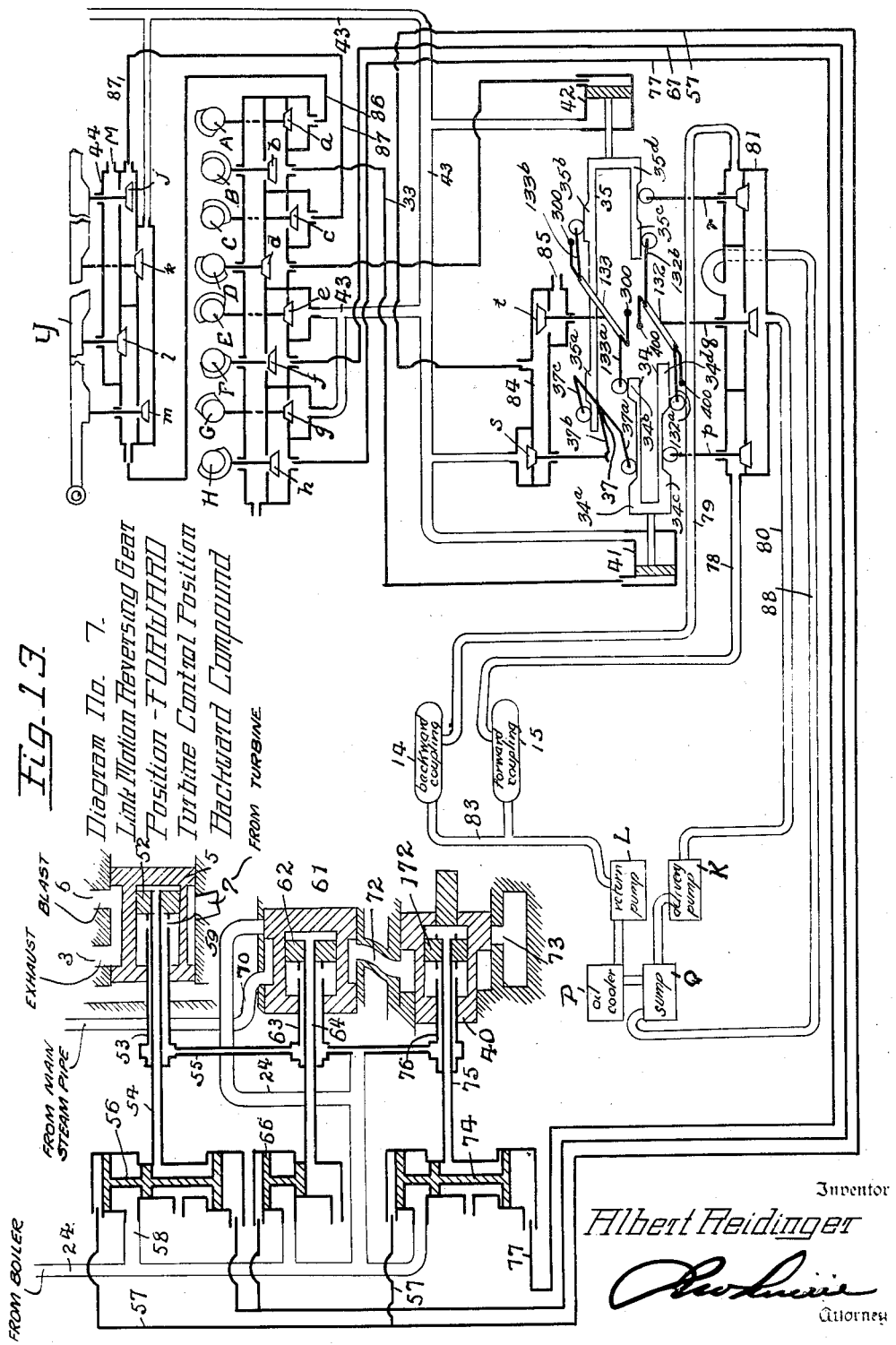

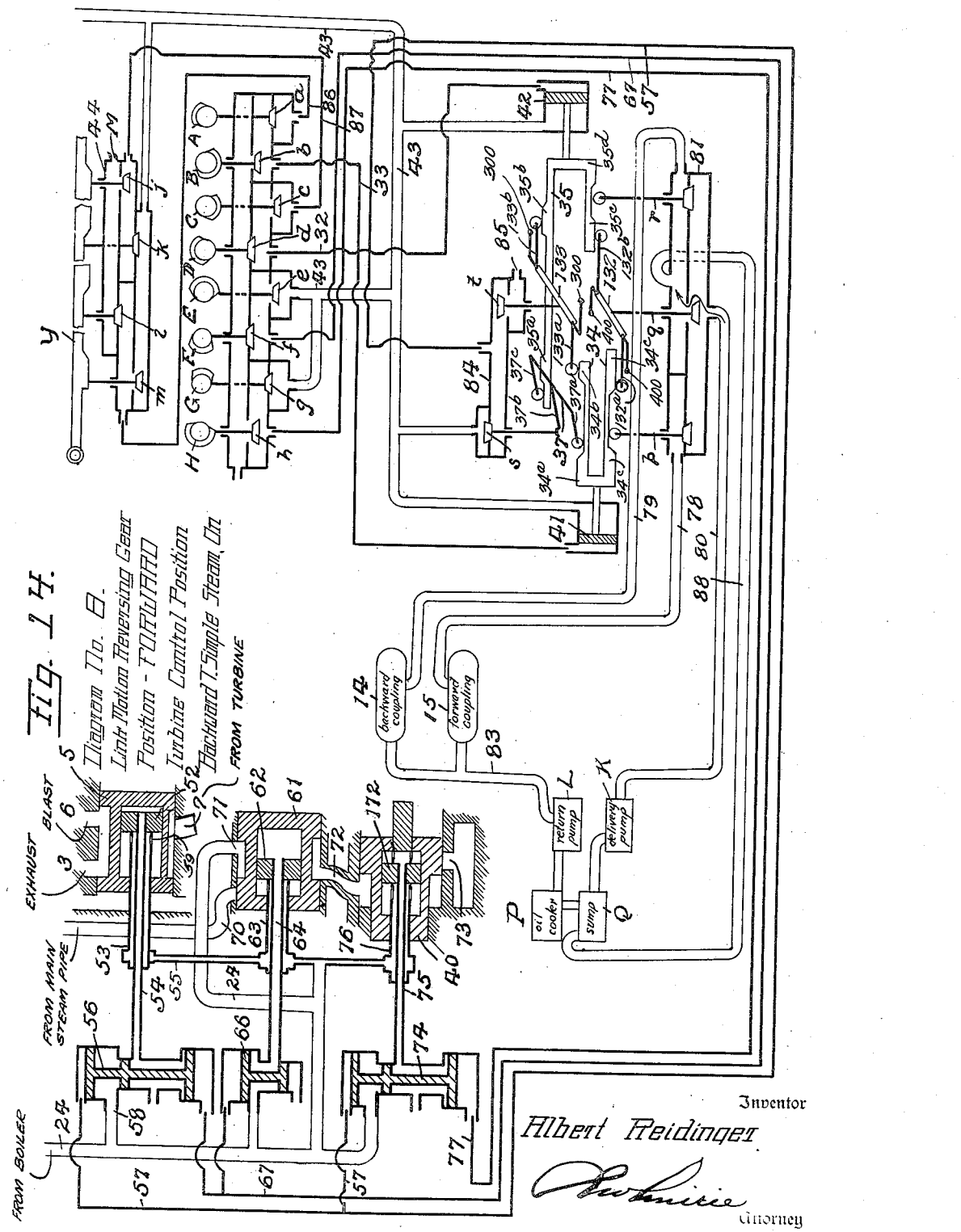

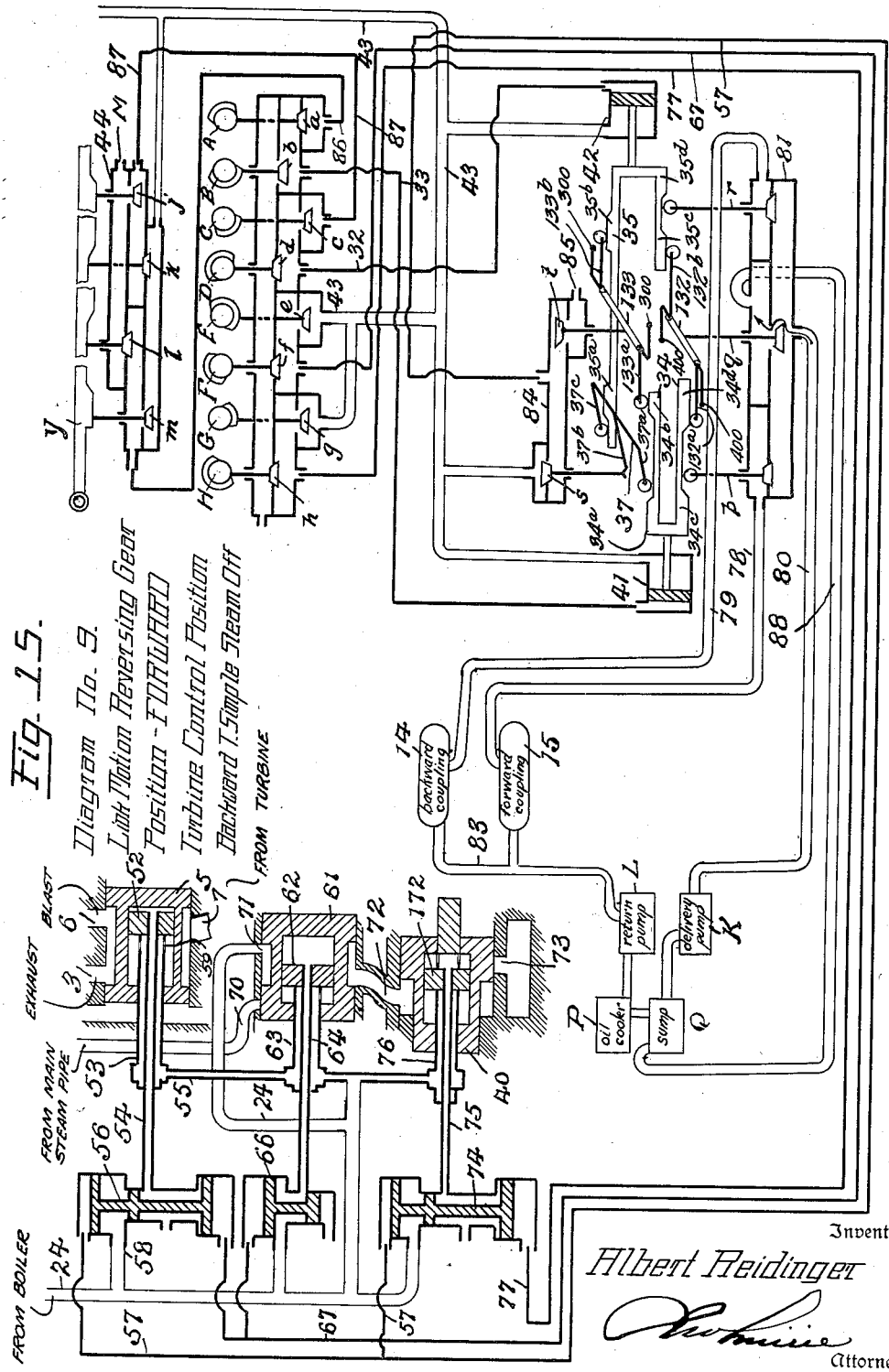

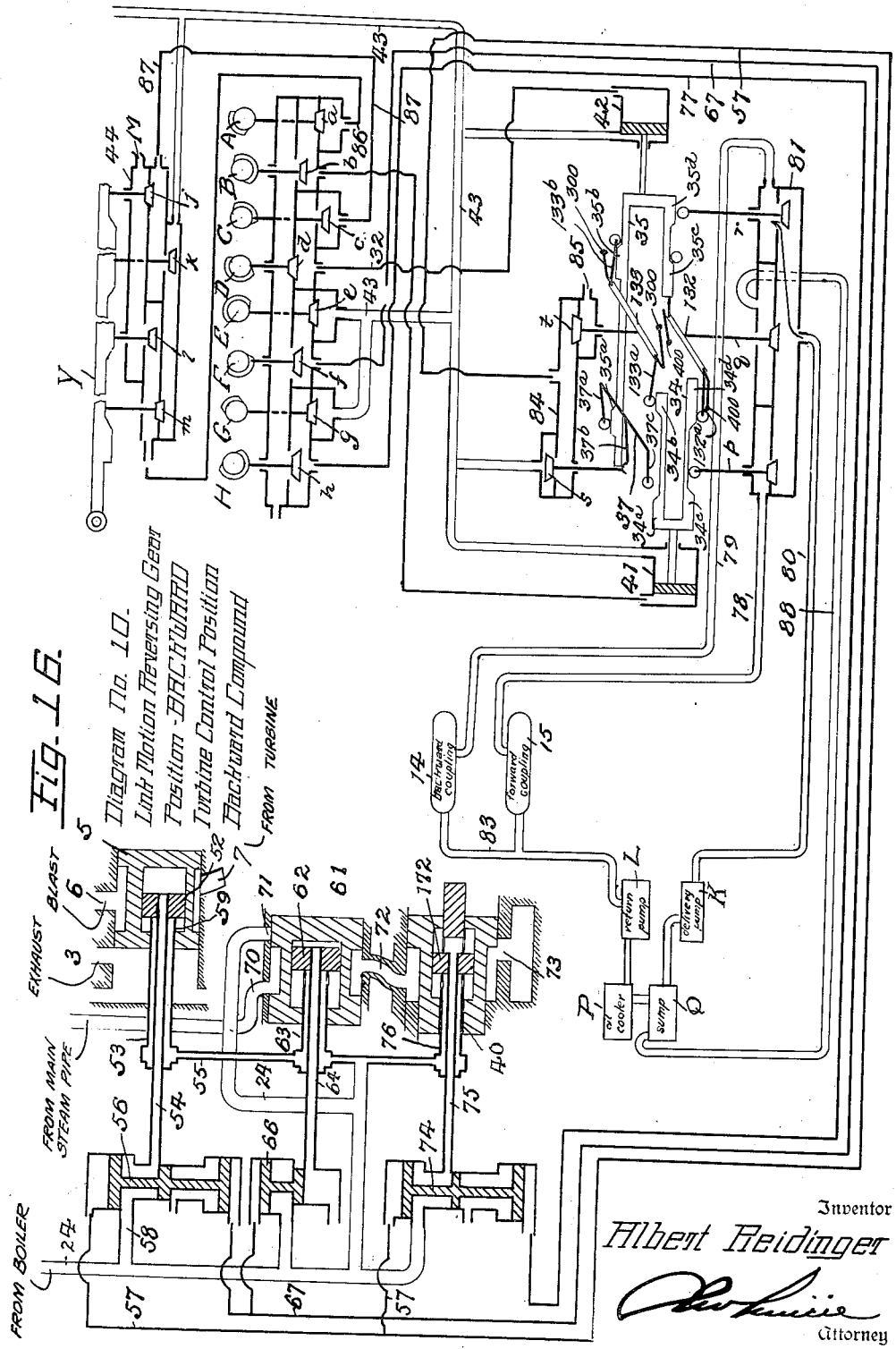

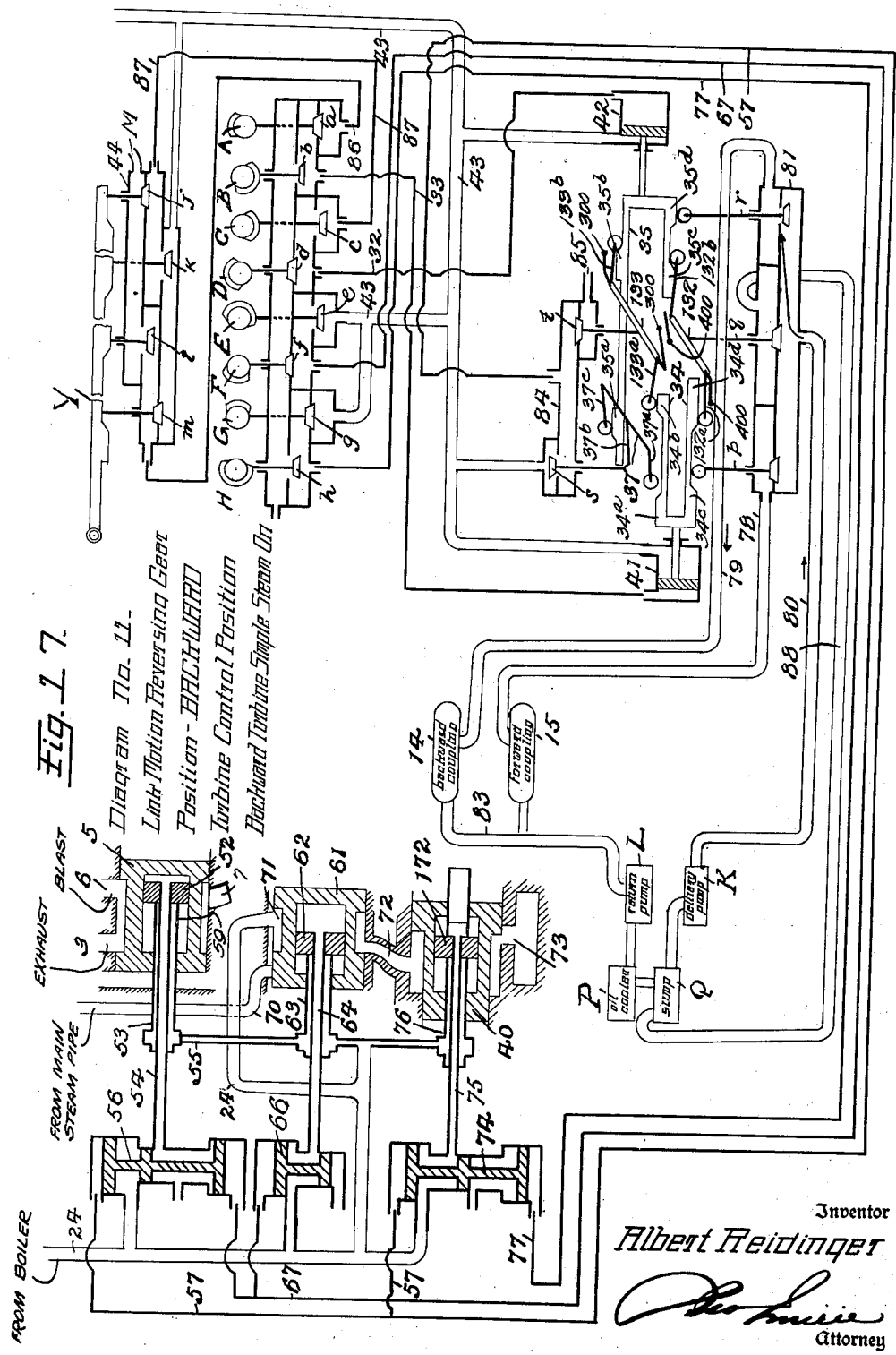

Patented Sept. 14, 1937

2,093,389

UNITED STATES PATENT OFFICE 2,093,389

STEAM LOCOMOTIVE

Albert Reidinger, London, England

Application August 2, 1935, Serial No. 34,441
In Great Britain March 12, 1934

3 Claims. (Cl. 60—21)

This invention relates to steam locomotives, and particularly to the control of steam turbines employed therein.

It is an object of the invention to provide control means whereby alternative couplings may be made operable to couple a unidirectional turbine to a driving wheel for movement in the forward or backward direction.

A further object of the invention is the provision in a locomotive of a reciprocating engine and a steam turbine and a steam receiver between the turbine and the cylinders of the reciprocating engine. Still further objects of the invention are the provision of control means whereby the exhaust steam from the cylinders of the reciprocating engine may be passed to the turbine or to the blast of the locomotive, and also whereby the turbine may be fed with steam which has not passed through the cylinders of the reciprocating engine.

With these and other objects in view, the invention consists in the improved combinations and arrangements contained in the embodiments now to be described in detail, the novel features of which are set out in the claims which follow.

In the drawings:—

Figs. 2, 2a, 3 and 3a illustrate diagrammatically the valve control for a locomotive having a unidirectional turbine capable of being coupled to the locomotive wheels alternatively by forward or backward coupling, these couplings being correlated to the reversing gear for the cylinders.

Figs. 2, 2a, 3 and 3a are to be regarded as part of one complete figure which are separated to avoid too small a scale in reproduction.

Fig. 4 shows a corresponding diagrammatic arrangement of controls and valves for a simplified construction in which a unidirectional turbine is arranged to be coupled to the locomotive axle only in forward running of the locomotive.

Figs. 6 and 6a illustrate diagrammatically the valve control for a locomotive in which a unidirectional turbine is employed alone.

Figs. 7 to 17, inclusive, are diagrammatic views illustrating various positions of the controlling parts of the mechanism.

Fig. 18 is a diagrammatic view showing different positions of the handle for properly positioning the cams of the control mechanism.

Fig. 19 is a view in elevation, partly in section, of the turbine.

In the arrangement shown in Figs. 2, 2a, 3 and 3a the turbine can be put into operation independently of the cylinders and steam at full pressure can be delivered to the receiver reducing valve and thence to the receiver at constant predetermined pressure to the turbine, but in the simplified arrangement of Fig. 4 the turbine can be driven only by exhaust steam passing from the cylinders.

Figure 1:
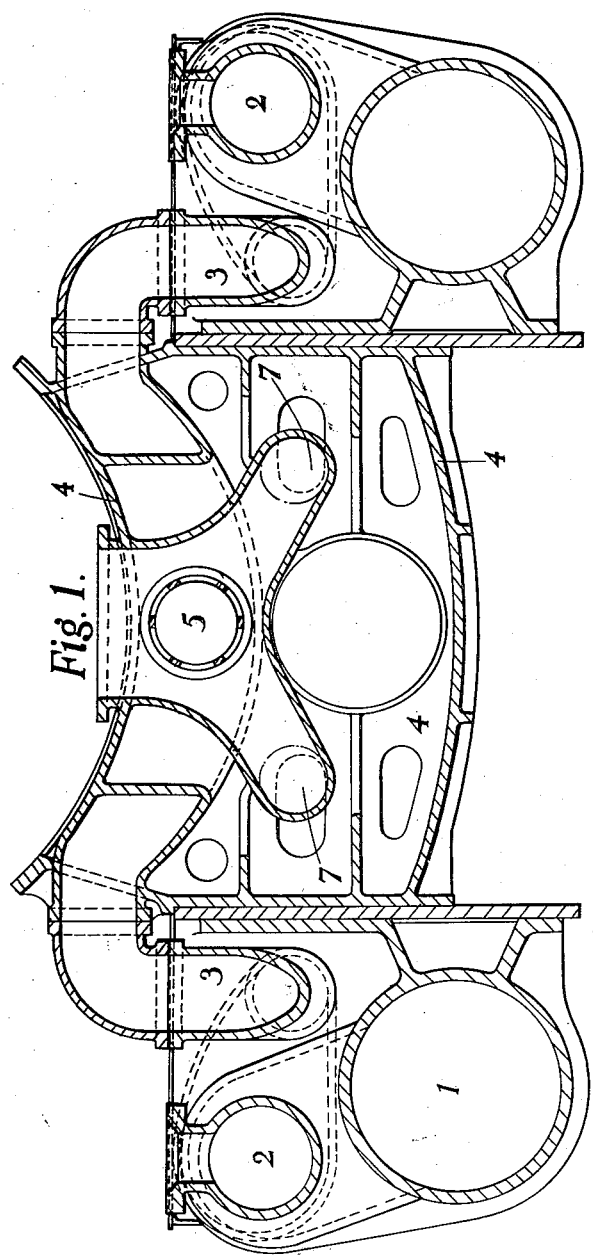
Fig. 1 represents a cross-section through the cylinders of the reciprocating engine of a locomotive incorporating the invention with a receiver for the steam to pass to an exhaust turbine arranged between the two cylinders.

Referring to Figs. 1 to 5 of these drawings the steam passes from the cylinders 1 and valve chests 2 by passages 3 into a receiver 4 which as illustrated in Fig. 1 takes the form of a hollow saddle casting stretching between the frame members of the locomotive.

An intercepting valve 5 is provided which may be set so as to cause the cylinder exhaust to pass straight up to the chimney 6 as indicated by the arrow X in Fig. 2 or to cause the exhaust from the turbine 8 to pass up from the passages 7 while the cylinder exhaust is fed direct into the receiver and thence into the turbine 8 through the inlet 10.

A safety valve 99 is provided within the receiver.

The turbine shaft 9 is connected through bevel wheels 11 to two shafts 12 and 13, one of which carries a forward coupling 14 and the other of which carries a backward coupling 15. These couplings are preferably of the hydraulic type commonly called "fluid flywheel" and the control of oil or like fluid to these couplings is effected automatically by means to be described in detail later in such a manner that only one coupling is operable at a time. On the driven side of these couplings pinions 16, 17 are provided which, through pinions 18, shaft 19 and pinions 20, 21 transmit the drive to one of the axles 22 of the locomotive.

Figure 5:
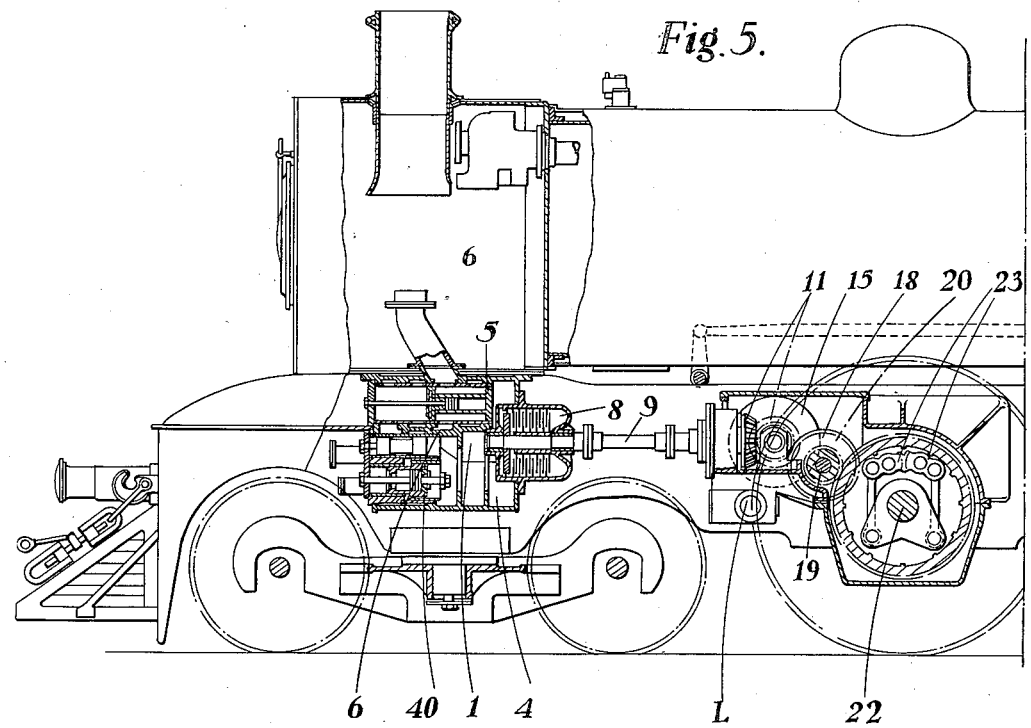
Figs. 5 and 5a show a cross-section through one form of locomotive in accordance with the invention, many details being omitted from this view for the sake of clearness of illustration.
Figure 5A:
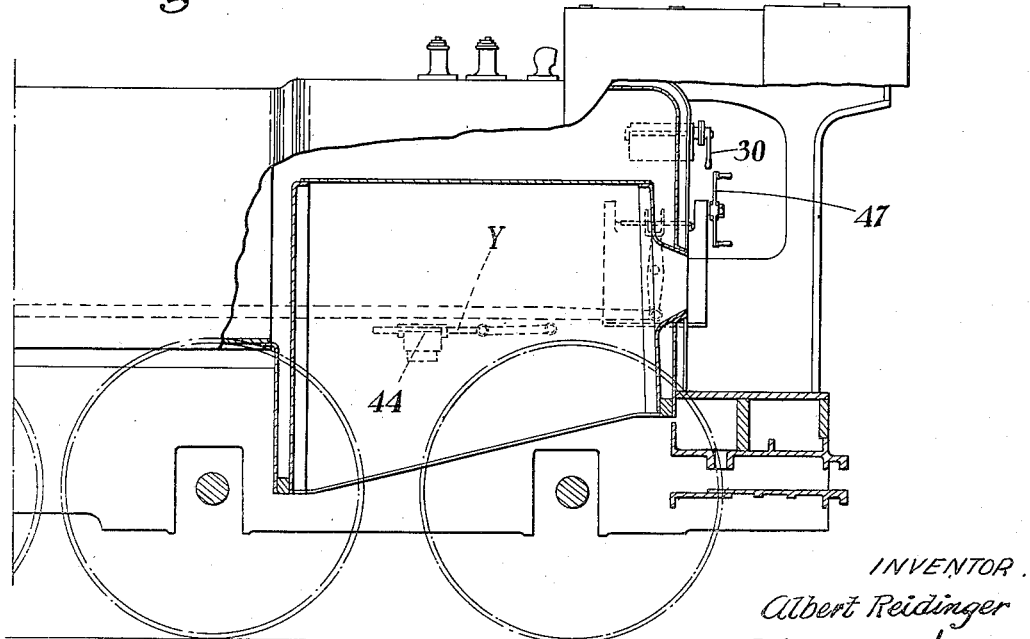

The axle 22 is preferably coupled to the corresponding wheel through a universal mechanism of known type which allows a certain amount of relative movement between them: such a mechanism 23 is indicated in Fig. 5. The coupling illustrated forms no part of the present invention, is conventionally known, and is disclosed and described in "Engineering", issue May 9, 1919, page 590.

The intercepting valve 5 is a steam-operated differential piston valve having a central cylinder 51 cooperating with a fixed piston 52 connected to co-axial pipes 53, 54; it is shown in a position giving direct communication between the cylinder 1 and the blast i. e. with the turbine cut-out.

The outer pipe 53 is connected by a pipe 55 to a pipe 24 always open to live steam while the admission of steam to the central pipe 54 is from a differential valve 56 controlled by steam leads 57, 67 from the control mechanism later to be described in detail.

In the position shown pipe 54 is closed to steam and 53 is open and steam enters the cylinder 51 through ports 59 and holds the valve in its extreme left-hand position; if valve 56 be lowered to bring the pipe 24 into communication with 54 through the pipe 58, steam bears on the right hand end surface 60 and the areas are such that the pressure on the surface 60 is greater than the pressure on the other end so that the valve 5 moves to the right and opens the receiver 4 to exhaust steam.

The control of flow to the receiver 4 and thus to the turbine is also provided for by an auxiliary valve 61 and a combined reducing and cut-off valve 40 now to be described; these enable steam to pass direct to the turbine should for any reason it be necessary to put the reciprocating engine out of action, or for maintaining the receiver pressure.

The auxiliary valve 61 is similar in principle to the intercepting valve 5 and has a fixed piston 62 connected to co-axial pipes 63, 64, the former always open by the pipe 65 to live steam from the main pipe 24, and the latter normally closed by a valve 66 controlled from the steam lead 67.

The receiver pressure bears upon both ends of the valve 61, a passage 68 being provided at the front end.

In the position of the valve shown the internal portion 69 of the valve is open to a steam pipe 70 connected to the main steam supply at a point after the main steam regulator, whereas the pipe 24 is connected to steam at a point before the conventional main steam regulator indicated at 200 in Fig. 2.

The pipe 24 is connected to the passage 71 and in the position of the valve shown this passage is closed.

In the position of the parts shown steam passes through the port 72 to the annular port surrounding the valve 40. This valve 40 is similar to the valves 5 and 61 having an internal fixed piston 172 carried by coaxial pipes 75 and 76; the valve, however, having an enlarged portion at the right hand end thereof, with the areas of the opposing faces so chosen that if the receiver pressure falls below a predetermined amount, the valve 40 will automatically move to the right and increase the receiver pressure by allowing steam to pass direct from the pipe 70 through the valve 61, port 72 and out through port 73 into the receiver 4. The pressure areas operating to produce the automatic reducing valve effect are the relatively small annular area to which the steam from port 72 has access, and the larger area at the right hand end of the valve which is subject to the pressure of the steam in the receiver. The pressures acting on these areas are that of live or boiler steam passing to the port 72 and that of the steam in the receiver respectively. The areas operating to produce the positive stop valve effect are those of the internal end faces of the hollow interior of the valve situated on opposite sides of the fixed piston 172, the pressures acting on these being the pressure of the live steam in conduit 24, as described in connection with valves 5 and 61. The area to the right of the fixed piston 172 is smaller than that to the left thereof.

When the valve 61 is operated through the control lead 67 and valve 66 steam passes direct from the passage 71 to the port 72, and the passage 70 is closed. Steam can then pass direct to the valve 40 which is provided with concentric pipes 75, 76 functioning in a manner similar to that already described for the other two valves under the control of a control valve 74. The valve 74 is operated in a similar manner to the valves 56 and 66 and has leads 57 and 77. The turbine may thus receive live steam from the boiler through the pipe 24 without passing through the regulator or the cylinder.

*Control mechanism.*—The turbine is controlled in its action by a control mechanism in the driver's cab which is of the nature of a steam relay device. In the form illustrated in Fig. 3a a series of cams A, B, C, D, E, F, G, H are mounted on a shaft Z provided with an operating handle 30. For convenience in this drawing in showing the relative operative positions of the cams they are illustrated as turned through 90° in relation to their shafts.

These cams operate a series of controlling valves *a, b, c, d, e, f, g, h,* which control the supply of steam to the various steam leads of the relays for controlling the couplings and the supply of steam to the turbine. This control is also connected up to the reversing gear 46 operated from a handle 47 by mechanism of known form to prevent the possibility of the turbine being put into forward position while the reversing gear is in backward position. For this purpose a series of cams Y are connected to the reversing mechanism to operate valves *j, k, l, m* mounted in a steam chest 44 to control the passage of steam to leads 86, 87.

By this means the reversing gear is coupled up to the control mechanism for the backward and forward couplings 14 and 15 in such a manner that the forward coupling cannot be put into operation when the link motion is set for reverse gear, as is described hereinafter.

These couplings are fed from a pump K which is driven off the turbine shaft by a transverse shaft 24A and which is connected up by a pipe 80 to a valve control chest 81: this valve chest is connected to the forward and reverse gears 14 and 15 by leads 78 and 79 respectively.

A return pump L also driven from the shaft 24A is connected to the two couplings by pipes 83, and returns oil to a sump Q through a cooler P. The oil circuits for the couplings are controlled by the valves *p, q* and *r* as follows: When the forward coupling is to be made operative, valve *p* is opened and valves *q* and *r* are shut, with the result that oil circulates from the sump Q, through pump K, pipe 80, valve chest 81, pipe 78, forward coupling 13, pipe 83, return pump L, cooler P and back to the sump Q. To render the backward coupling operative, valves *p* and *q* are closed and valve *r* opened, whereupon the circuit is sump Q, pump K, pipe 80, chest 81, pipe 79, backward coupling 15, pipe 83, return pump L, cooler P, and sump Q. The closing of valves *p* and *r* and the opening of valve *q* results in no coupling being operative, oil delivered to the chest 81 by the pump K through pipe 80 being returned direct to the sump by the pipe 88.

The operation of valves *p, q, r* in the valve chest 81 is effected by two coupling cylinders 41, 42, controlled by leads 32, 33 from the valve chest 31 in which the cam operated valves *a, b, c, d, e, f,*

$g$, $h$ are mounted. A further valve chest 84 carrying valves $s$, $t$ is provided for controlling steam to the lead 57 and exhaust to atmosphere by the passage 85. Live steam is brought to the coupling cylinders 41, 42 by a pipe 43, which also feeds the valves $e$ and $g$ in valve chest 31 and valves $k$ and $m$ in valve chest 44 which is connected up with the reversing gear. Exhaust pipes M are provided to the steam chests.

The valves $q$, $s$, $t$ are operated by rocker arms 132, 133, 37 acted upon in differential manner by cam-carrying frames 34, 35 operated respectively by the coupling cylinders 41, 42 and the valves $p$, $r$ are acted upon directly by these cams. A pipe 88 connects the valve chest 81 to the sump Q.

The cam carrying frames 34 and 35 are operated respectively by the coupling cylinders 41 and 42. Each of the frames are rigid elements comprising upper and lower bars connected by an end bar, with the end bar connected rigidly to the pistons in the cylinders 41 and 42, as the case may be, for reciprocating the frames in the movements of the pistons. The upper bar of frame 34 has cam projections 34$^a$ and 34$^b$ while the lower bar of such frame has cam projections 34$^c$ and 34$^d$. A rocker arm 37 is mounted adjacent the frames 34 and 35 and has an extension 37$^a$ adapted, in the movement of the frame 34 in one direction, to be engaged and raised by the cam 34$^a$ and a further projection 37$^c$ to be engaged and raised by a cam 35$^a$ on the cam frame 35, as later described, so that simultaneous movement of the arms 37$^a$ and 37$^c$ by the cams will cause a finger 37$^b$ projecting from the rocker arm 37 to engage the stem of valve $s$ and open or elevate such valve. The cam frame 35 has upper and lower bars similar to the frame 34 with an end bar connected to the piston of the cylinder 42, whereby the frame 35 is operated. The upper bar of this frame 35 has cam projections 35$^a$ and 35$^b$ while the lower bar, which is shorter than the upper bar, has cam projections 35$^c$ and 35$^d$. A rocker arm 133 is supported for swinging movement on remote pivots 300 and has a projection 133$^a$ cooperating with cam 34$^b$ of the cam frame 34 and a second projection 133$^b$ cooperating with cam 35$^b$ of the cam frame 35. The rocker arm 133 engages the stem of valve $t$ to control the valve. Obviously, when the frames 34 and 35 are moved to cause the projections 133$^a$ and 133$^b$ to be operated by their respective cams, the rocker arm 133 will be moved upwardly on its pivot 300 and so open the valve $t$. A rocker arm 132 swingingly supported on remote pivots 400 has end projections 132$^a$ and 132$^b$ to be operated by the respective cams 34$^d$ and 35$^c$. When both said projections 132$^a$ and 132$^b$ are operated by the cams referred to, the rocker arm 132 engages the stem of valve $q$ and opens the valve. The stem of valve $p$ is engaged and operated to open the valve $p$ through action of the cam 34$^c$ in the movement of the frame 34; while the stem of valve $r$ is engaged and operated to open the valve $r$ by the action of cam 35$^d$ in the movement of the frame 35 in one direction.

In the position of parts illustrated both of the couplings 14, 15 are empty so that the turbine is not coupled to the shaft 22; the cams A ... H are shown in the position in which the turbine is not being driven and the link motion is shown in mid gear.

If steam is supplied to the cylinder 41 by the lead 33, owing to the opening of the valves $a$ and $m$ and closing of the valves $b$ and $l$, the piston moves to the right, with the result that the valve $p$ is opened by the differential valve gear, comprising the rockers 37, 132 and 133 and the cams 34 and 35, and valve $q$ is closed; this actuation of these valves results in the forward coupling being made operative. Similarly the supply of steam to the cylinder 42 by way of the lead 32 results in the backward coupling being rendered operative.

When the wheel 47 is set for forward motion of the locomotive, the cam Y is moved to the right as seen in Figure 3$a$, with the result that valves $j$ and $m$ are open and valves $k$ and $l$ closed; steam is thus supplied to the lead 86, whilst the lead 87 is open to exhaust.

A study of Figure 3$a$ will reveal that the lead 86 is connected to the cylinder 41, the connection being under the control of the valves $a$ and $b$, whilst the lead 87 is connected, under the control of the valves $c$ and $d$, to the cylinder 42. Thus, when the reciprocating engine is set for forward movement, steam cannot be supplied to the cylinder 42 no matter how the valves $a$, $b$, $c$ and $d$ are actuated by the lever 30, and the forward coupling 14 alone can be made operative.

In the same way, the hydraulic interlock between the control devices actuated by the handle 30 and wheel 47 respectively is such that the backward coupling 15 alone can be made operative when the wheel 47 is set for reverse movement of the locomotive. When the wheel 47 is set for backward motion of the locomotive, the cam Y is moved to the left, as seen in Figure 3$a$, until valves $k$ and $l$ are opened and valves $j$ and $m$ are closed, with the result that lead 87 is supplied with steam while lead 86 is opened to exhaust. With the cam Y in such a position, opening of valve $c$ and closing of valve $d$ will result in steam being supplied to cylinder 42 by lead 32, the backward coupling 15 being made operative, while no actuation of valves $a$ and $b$ can cause steam to be passed to cylinder 41 by lead 33.

A comparison of Figures 2, 2$a$, 3 and 3$a$ will show that the lead 57 is a master lead as regards the supply of steam to the turbine, in that no steam can pass to the turbine unless this lead is supplying steam to tend to depress one or both of the valves 56 or 74. Since the lead 57 is supplied with steam only when the valves $s$ and $t$ are opened and closed respectively through the agency of one of the pistons 41 or 42 and the differential valve mechanism, the interlocking of the relay controls is such that steam cannot be supplied to the turbine when no coupling is operative, and racing of the turbine is avoided.

The lead 67, the flow of steam in which is controlled by the valves $e$ and $f$, is a selective lead, in that, when it supplies steam, the valve 61 is moved to a position in which the valve 40 is supplied, by the port 72, with steam from the lead 24 instead of from the lead 70, the valve 5 being at the same time moved to cut off the supply of exhaust steam.

The lead 77 is provided to give the driver control over the automatic reducing valve 40 whereby he may cause it to act as a stop valve to cut off entirely the supply of steam to the turbine at times when the latter is not running in compound with the reciprocating engine.

When steam is supplied to this lead, upon the opening of valve $g$, valve $h$ being closed, the relay valve 74 is raised with the result that the space within this valve, and to the right of the fixed piston 172 carried by the coaxial pipes 75 and 76, is opened to exhaust. The pressure of the steam from pipe 24, which is constantly admitted to the space to the left of the fixed piston, is thus able to maintain the valve 40 in the position shown in Figure 2: with the valve 40 in this position, no steam can pass to the receiver by way of the port 73.

The relation of the cams on the spindle Z is such that steam can only be supplied to the lead 77 at times when the turbine is not in compound with the reciprocating engine. At all other times when there is steam in the master lead 57 but not in the lead 77, that is when it is desired that the turbine shall run in compound with the turbine, or shall not run in compound but receive steam only direct from the boiler, the valve 74 is lowered and steam from pipe 24 is admitted on both sides of the fixed piston.

The valve 40 is then in equilibrium as regards the pressure acting on the fixed piston and the internal spaces of the valve, and is controlled by the opposing action of the receiver pressure and the pressure of the steam supplied to port 72. The areas of the opposing faces of the enlarged portion of the valve 40 are so chosen that, when the pressure in the receiver is at a predetermined value, the load on the larger face, due to the relatively low receiver pressure, is equal to the load on the smaller face, due to the relatively higher pressure of the steam in port 72. If the receiver pressure falls below the predetermined minimum value, the pressure of the boiler steam is able to move the valve to the right, whereupon steam is admitted to the receiver by port 73. If the receiver pressure rises above the predetermined pressure, the load on the larger face exceeds the load on the smaller face, and the valve moves to the left, cutting off the supply of steam from the port 72.

Referring now to Fig. 4, which represents diagrammatically the arrangement without provision for reversal of the turbine the corresponding references are used to designate the parts already described in relation to Figs. 2, 2a, 3 and 3a.

The intercepting valve 5 is shown in the position in which the turbine is out of action and steam passes direct from the exhaust passage 3 from the cylinders to the blast pipe 6.

If the intercepting valve is moved to the right the steam from the exhaust passes to the receiver 4 and thence by the inlet 10 into the turbine 8 which connects up to the locomotive wheel through a unidirectional coupling 14 in a manner previously described.

The reversing link 46 and its operating handle 47 are shown in mid-gear and in this position the valves $j$, $k$, $l$, $m$ are so operated that $j$ and $l$ are open and $k$ and $m$ are shut and this condition is maintained from mid-gear to full backward gear.

Valve $l$ then connects to the exhaust 17 the inner pipe 54 of the intercepting valve 5 thus causing the latter to be held in the position shown in the drawings.

Valve $j$ allows oil to pass direct from the pump K to the sump Q through pipes 218 and 219 respectively.

Valve $m$ prevents steam from passing from the steam pipe 24 to the inner pipe 54 of the intercepting valve and valve $k$ prevents oil from passing from the pump to the coupling through the pipe 220. The turbine is cut off because of the absence of steam in the receiver.

Immediately the wheel 47 is operated to move the valve mechanism into forward position valves $l$ and $j$ will close and valves $m$ and $k$ will open.

This will cause the intercepting valve to move to the right and bring steam into the receiver and thus to the turbine, while it will cut off steam from direct passage from the cylinder exhaust 3 to the blast pipe 6. The delivery pump K will then transmit oil to the coupling 14 via the pipe 218, the open valve $k$ and the pipe 220 so that the turbine is directly coupled to the locomotive axle 22.

Although I have described the invention so far as applied to the common type of locomotive in which the cylinders are coupled direct to the wheels without any speed reduction gear I wish it to be understood that the invention is equally applicable to the cases in which high speed reciprocating engines are connected to the driving wheel or wheels through reduction gearing.

Figure 6A:
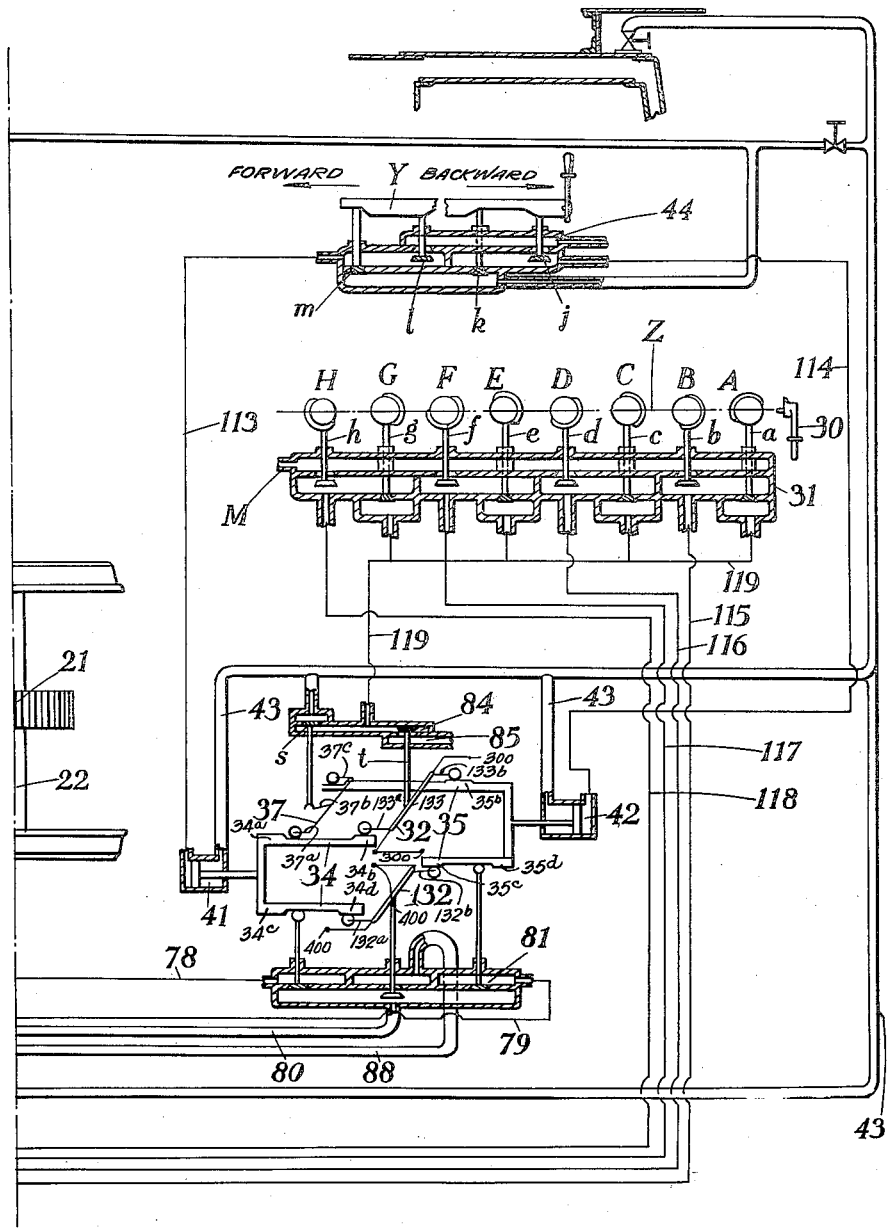

The invention is also applicable to turbine locomotives in which no reciprocating engine is employed. In such an application, it is preferred to use an arrangement as shown in Figs. 6 and 6a.

In this arrangement the turbine 8 is provided with four nozzles having feed pipes 100, 101, 102 and 103 respectively, which receive steam from the branches 104, 105, 106 and 107 of the main steam pipe 108. The flow of steam in each individual feed pipe is controlled by a valve 109 in a common valve chest 110.

The valves 109 are similar in construction to the valve 5 shown in Fig. 2, and comprise each a central cylinder 151 cooperating with a fixed piston 152 connected to coaxial pipes 153 and 154.

The opposite ends of the cylinders in which the piston valves 109 work are connected by pipes 155, in order to balance the end pressure on the valves when they are supplying steam.

The arrangement of valves in the chests 81, 84, 31 and 44 are the same as those shown in Fig. 3a, but the pipe connections to these chests, with the exception of those to the chest 81, are to some extent different.

The connections to the valve chests, insofar as they differ from those shown in Figs. 2, 2a, 3 and 3a, are as follows:

The chamber of the chest 44 which is controlled by the valves $l$ and $m$ is connected by a pipe 113 to the cylinder 41, whilst the cylinder 42 is connected by a pipe 114 to the chamber controlled by the valves $j$ and $k$.

The chambers of the chest 31 which are controlled by the exhaust valves $b$, $d$, $f$ and $h$ respectively are connected, by pipes 115, 116, 117 and 118 to the inner pipes 154 of the valves 109 controlling the flow of steam in the nozzle feed-pipes 100, 101, 102 and 103 respectively.

The chambers just referred to of the chest 31 are fed, at the appropriate times, (i. e. when one of the couplings 14 or 15 is operative), by steam from the chest 84 which is connected by a pipe 119 to the subsidiary chambers controlled by the valves $a$, $c$, $e$, and $g$ respectively.

The outer pipes 153 of the valves 109 are constantly fed with steam from the pipe 43 by branches 43A.

The relays provided for controlling the couplings and the supply of steam to the turbine are hydraulically interlocked, as is clear from the drawings, so that steam cannot be supplied to the turbine when no coupling is operative. Steam supplied to the inner pipe 154 of any of the valves 109 to cause the valve to move to admit boiler steam to the corresponding nozzle of the turbine must necessarily pass (to the leads controlled by the valves $a$ to $h$) through the lead 119, which is controlled by the valves $s$ and $t$; these valves, in turn, are controlled by the cam member Y, through the valves *j, k, l* and *m,* and the differential valve gear provided for controlling the couplings. Thus, no steam can be fed to the turbine unless the cam Y is moved to cause steam to pass to one or the other of the cylinders 41 or 42, when one or the other of the couplings 14 or 15 will be made operative.

The cams A to H in this construction are adapted to cause the supply of steam to the turbine to be cut off or to be permitted to one or more of the four nozzles. As shown, the reversing handle 112 is in the mid position and the steam supply to the turbine is cut off.

An auxiliary steam engine N, fed from the pipe 43 by a branch 120, is provided to drive the pumps K and L.

Figures 7 to 17, inclusive, represent diagrammatic views showing different positions of the various elements during different stages of operation. These will be described more or less specifically in order to permit an understanding of the relative positions of the various elements for each diagram, the diagrams being plainly labeled as to the primary function of the arrangement of elements shown in that diagram.

DIAGRAM 1

*Link motion reversing gear position "mid"*

*Turbine control position. "Forward compound"*

This means that the locomotive is running in the forward direction with the reversing gear set to give minimum piston valve travel, i. e. with the die blocks in the center position of the expansion link, while the turbine is operating on the exhaust steam from the locomotive cylinder boosted through the reducing valve to a predetermined pressure, and the fluid coupling for forward running is made operative by the oil circulation. This results in the reciprocating cylinders and the turbine both driving the locomotive in the forward direction.

The above results are obtained in the following manner. The cam bar Y being positively connected to the reciprocating engine reversing gear takes up a position that results in valves *j* and *l* being closed and valves *k* and *m* being open, so that steam from the boiler passes from the pipe line 43 to valves *c* and *a* respectively. The turbine control operates the shaft on which are mounted cams and the position of this shaft and its cams results in valves *a, d, f* and *h* being open and valves *b, c, e* and *g* being closed. As valve *a* is the only steam valve open, the steam passed by valve *m* is then passed through valve *a* and on to the cylinder 41. Steam pressure on to this cylinder causes the frame 34 to move to the right. The action of the cams on this frame results in valve *q* being closed and valve *p* being open. As valve *p* is open this permits oil from the delivery pump to circulate through the forward coupling 15, thus connecting the turbine drive to the driving axle. The frame 34 as well as controlling the oil circulation, closes the valve *t* and opens the valve *s*. This valve receives steam from the boiler through pipe line 43 and passes it into the pipe line 57, which in turn passes the steam into the relay valves 74 and 56. The moving part of valve 56 takes up the position indicated, because the steam from pipe line 57 acts on a larger area than the steam from the boiler through pipe line 24. This position of valve 56 permits steam to pass from the boiler by way of pipe line 24 to the inside of valve 5. As the piston 52 now has boiler steam delivered from pipe line 24 acting on both sides of its head and the areas of these sides are different, the valve 5 moves to the right. This permits the exhaust steam from the reciprocating cylinders to pass from the pipe line 3 into the receiver of valve casing, and allows the turbine exhaust to pass to the locomotive blast pipe via pipe 6. As valve 74 also receives steam through pipe line 57 and 24 and due to the difference of areas that this steam is acting upon, the moving part of the valve 74 has taken up a position that allows boiler steam from line 24 to pass to the right hand side of the piston 172. As the left hand side of the piston 172 is in constant communication with the pipe line 24, this piston now has boiler steam at both sides of its head, and as the areas of this piston upon which steam acts are the same on both sides of its head, this renders the valve 40 free to float on the piston 172. Considering the relay valve 66, the under side of the main piston head of the moving valve 66 receives a constant supply of steam through pipe line 24 from the boiler, and as the top side of the piston head is in communication with the atmosphere through the pipe line 67 and the valve *f*, the valve 66 takes up a position which exhausts steam from the right hand side of the piston head 62, and as the left hand side of this piston is in constant communication with the boiler, this causes the valve 61 to move to the left, which passes steam from the main steam pipe through pipe line 70 to an annulus of the valve 40. As has been already found valve 40 is free to slide on the piston 172, and as the right hand side of this valve is in communication with the receiver of valve 5 and an annulus on this valve 40 is connected to the pipe line 70 through the duct 72 and valve 61 and due to the difference of area of the annulus compared to the head of the valve, steam will pass to the receiver 4 only when the receiver pressure is below a predetermined figure.

DIAGRAM 2

*Link motion reversing gear position, "mid"*

*Turbine control position, forward turbine simple—steam on*

This means that the locomotive is running in a forward direction with the reversing gear set to give a minimum piston valve travel, i. e. die blocks in center of expansion link with the main throttle of the locomotive closed, that is reciprocating engine developing no power, while the turbine is receiving steam only from the boiler, and the fluid coupling for forward running is rendered operative. This results in the turbine only driving the locomotive. The above results are obtained in the following manner.

The cam bar Y being positively connected to the reciprocating engine reversing gear, takes up a position that results in valves *l* and *j* being closed and valves *k* and *m* being open, so that steam from the boiler passes from the pipe line 43 to the valves *a* and *c*. The turbine control operates the shaft on which are mounted the cams A to H and the position of this shaft and its cams results in valves *b, c, f* and *g* being closed and valves *a, d, e* and *h* being open. Considering the cylinder 41, as the right hand side of this cylinder is always in communication with the boiler through the pipe line 43 since the left hand side of this cylinder is now open to the boiler through valves *a* and *m* and due to the difference in areas of the sides of the piston, the frame 34 moves to the right. In the cylinder 42 the left hand side of the cylinder is in constant communication with the boiler by pipe 43 and the right hand side is open to the atmosphere by the valve d, the frame 35 moves to the right. The result of the action of the cams mounted on the frames 34 and 35 is that valves q and r are closed and the valve p is open. This permits oil to circulate through the forward coupling, thus rendering it operative. The action of the frames 34 and 35 also causes valve t to shut and the valve s to open; this communicates the upper cavity of the relay valve 56 and the upper part of the relay valve 74 with the boiler through pipe line 43. Consider the relay valve 56. The upper cavity is connected to the boiler, the cavity immediately under the main head of the moving part of the valve is constantly connected with the boiler through pipe line 24, and the lower cavity of the valve is connected with the boiler through pipe 67, valve e and pipe 43. The result of these varying pressures is to place the moving part of relay valve 56 in such a position as to cause the right hand side of the piston 52 to be connected to atmosphere and as the left hand side of the piston 52 is in constant connection with the boiler by pipe line 24, the valve 5 moves to the left, thus permitting the exhaust steam from the cylinder of the reciprocating engine to pass to the locomotive blast pipe 6. Thus no exhaust steam enters the receiver.

Consider the relay valve 66, the upper cavity of the valve is connected to the boiler through pipe 67, valve e and pipe line 43 and the middle cavity is constantly connected with the boiler through pipe line 24. Thus the moving part falls and connects the right hand side of the piston 62 with the boiler through pipe 24 but the left hand side of the piston 62 is constantly connected with the boiler by pipe 24. Due to the difference of areas of the sides of the piston 62 the valve 61 moves to the right and steam from the boiler passes by pipe 24 through valve 61 to an annulus on valve 40. Consider the relay valve 74, here the upper cavity is connected to the boiler through conduit 57, valve s and pipe line 43. The cavity immediately under the main piston head of the valve 74 is constantly connected to the boiler by pipe 24 and the lower cavity is open to atmosphere through conduit 77 and valve h. Thus the moving part of valve 74 takes up a position so as to connect the right hand side of the piston 172 with the boiler through pipe 24, and as the left hand side of the piston 172 is constantly connected with the boiler through pipe 24, and the areas of the sides of the piston are the same, then the valve 40 is free to float on the piston 172. Therefore, the steam from the boiler through pipe 24 and valve 61 passes to an annulus on valve 40, as the steam in the receiver is acting upon the main head of the valve 40. The result of these pressures is to allow steam to pass from the steam pipe to the receiver in a manner so as to keep the receiver pressure at a predetermined figure.

Thus, it is found that the cylinder exhaust is in communication with the locomotive blast pipe, that the receiver is filled with steam at a predetermined pressure directly from the boiler, i. e. the turbine operates on steam from the boiler and that the fluid coupling for forward gear is supplied with oil to render it operative. So it is found that the reciprocating engine is not developing power, and that the turbine alone is driving the locomotive.

DIAGRAM 3

*Link motion reversing gear position "forward"*

*Turbine control position "off"*

This means that the locomotive is running in the forward direction, with the reversing gear set to give a suitable piston valve travel, while the turbine is not receiving any steam and both fluid couplings are inoperative. This results in the reciprocating cylinders only driving the locomotive.

The above results are obtained in the following manner. The cam bar Y being positively connected to the reciprocating engine reversing gear takes up a position that results in valves l and k being closed and valves j and m being open, so that steam from the boiler passes from the pipe line 43 to the valve a. The turbine control operates the shaft on which are mounted the cams A to H and the position of the shaft and its cams results in valves a, c, e and g being closed and valves b, d, f and h being open, thus no steam is passed through this control. Considering the cylinder 41, as the right hand side of this cylinder is always in communication with the boiler by pipe line 43 and the left hand side is in communication with the atmosphere through valve b, the frame 34 moves to the left, and in the cylinder 42 the left hand side of the cylinder is in constant communication with the boiler by pipe 43 and the right hand side is open to atmosphere by the valve d, the frame 35 moves to the right. The result of the action of the cams mounted on the frames 34 and 35 is that valves p and r are shut and valve q is open. This permits oil to pass from the delivery pump to the sump without passing through either of the fluid couplings. This delivery is effected by the residual momentum of the turbine at the time of control changeover. It is further understood that the turbine shaft will rotate and operate the pumps when steam is supplied to the turbine. The coupling to be operated becomes filled before any injurious racing of the turbine can occur. The action of the frames 34 and 35 also causes the valve s to shut and the valve t to open. This communicates the upper cavity of the relay valve 56 and the upper part of the relay valve 74 with the atmosphere.

Consider relay valve 56, the upper cavity is connected to atmosphere, the cavity immediately under the main head of the moving part of the valve is constantly connected with the boiler through pipe 24, and the lower cavity of the valve is connected with the atmosphere through conduit 67 and valve f. The result of these varying pressures is to place the moving part of relay valve 56 in such a position as to cause the right hand side of the piston 52 to be connected to atmosphere, and as the left hand side of the piston 52 is in constant connection with the boiler by pipe line 24 the valve 5 moves to the left, thus permitting the exhaust steam from the cylinder through 3 to pass to the locomotive blast pipe 6. Thus no exhaust steam enters the receiver.

Consider the relay valve 66, the upper cavity of this valve is connected to the atmosphere through conduit 67 and valve f and the middle cavity is constantly connected with the boiler through pipe line 24, thus the moving part rises and connects the right hand side of the piston 62 with the atmosphere, but the left hand side of the piston 62 is constantly connected with the boiler by pipe 24. Thus valve 61 moves to the left, and steam from the steam pipe passes by pipe 70 through valve 61 to an annulus on valve 40.

Consider the relay valve 74, here the upper cavity is open to atmosphere through the valve t, the cavity immediately under the main piston head of the moving part of valve 74 is constantly connected with the boiler by pipe 24, and the lower cavity is open to atmosphere through valve h, thus the moving part takes up a position so as to connect the right hand side of the piston 172 with the atmosphere and as the left hand side of the piston is constantly connected with the boiler through pipe 24, the valve 40 moves to the left, thus stopping the steam from the steam pipe 70 that passes through valve 61 from getting to the receiver.

Thus, it is found that no steam can reach the receiver, so that the turbine does not operate, and also that no oil reaches the fluid couplings, so that the turbine is not connected with the driving wheels. Thus the reciprocating cylinders alone drive the locomotive.

DIAGRAM 4

*Link motion reversing gear position "forward"*

*Turbine control position—Forward compound*

This means that the locomotive is running in a forward direction with the reversing gear set to give a suitable piston valve travel, while the turbine is receiving exhaust steam from the cylinders, boosted to a predetermined pressure, and the fluid coupling for forward running is rendered operative. This results in the cylinders and turbine working in compound and both driving the locomotive. The above results are obtained in the following manner.

The cam bar Y being positively connected to the reciprocating engine reversing gear, takes up a position that results in valves l and k being closed and valves j and m being open, so that steam from the boiler passes from the pipe line 43 to the valve a. The turbine control operates the shaft on which are mounted the cams A to H, and the position of this shaft and its cams results in valves b, c, e and g being closed, and valves a, d, f and h being open. Considering the cylinder 41, as the right hand side of this cylinder is always in communication with the boiler by pipe line 43 and the left hand side is in communication with the boiler through valves a and m and the pipe line 43, and due to the difference in areas of the sides of the piston the frame 34 moves to the right. In the cylinder 42 the left hand side of the cylinder is in constant communication with the boiler by pipe 43 and the right hand side is open to atmosphere by the valve d, the frame 35 moves to the right. The result of the action of the cams mounted on the frames 34 and 35 is that valves q and r are closed, and valve p is open. This permits oil to circulate through the forward coupling, thus rendering it operative. The action of the frames 34 and 35 also causes valve t to shut and the valve s to open, this communicates the upper cavity of the relay valve 56 and the upper part of the relay valve 74 with the boiler through conduit 57, valve s, and pipe line 43. Consider relay valve 56, the upper cavity is connected to the boiler as just described, the cavity immediately under the main head of the moving part of the valve is constantly connected with the boiler through pipe 24, and the lower cavity of the valve is connected with the atmosphere through the conduit 67 and valve f. The result of these varying pressures is to place the moving part of valve 56 in such a position as to cause the right hand side of the piston 52 to be connected to the boiler through pipe 24, as the left hand side of the piston is in constant communication with the boiler by pipe line 24, the valve 5 moves to the right, thus permitting the exhaust steam from the cylinder to pass to the receiver, and the exhaust from the turbine to pass to the locomotive blast pipe 6. Thus the turbine is supplied with exhaust steam from the cylinders. Consider the relay valve 66, the upper cavity of this valve is connected to the atmosphere through conduit 67 and valve f, and the middle cavity is constantly connected with the boiler through pipe line 24, thus the moving part rises and connects the right hand side of the piston 62 with the atmosphere, but the left hand side of the piston 62 is constantly connected with the boiler by pipe 24. Thus valve 61 moves to the left and steam from the steam pipe passes by pipe 70 through valve 61 to an annulus on valve 40.

Consider the relay valve 74, here the upper cavity is connected to the boiler through conduit 57, valve s and pipe line 43. The cavity immediately under the main piston head of the moving part 28 is constantly connected to the boiler by pipe 41, and the lower cavity is open to atmosphere through valve h. Thus the moving part of valve 74 takes up a position so as to connect the right hand side of the piston 172 with the boiler through pipe 24, and as the left hand side of the piston 172 is constantly connected with the boiler through pipe 24, and the areas of the sides of the piston are the same, then the valve 40 is free to float on the piston 172. Therefore, the steam from the steam pipe through pipe 70 and valve 61 passes to an annulus on valve 40, and as the steam in the receiver is acting upon the main head of the valve 40, the result of these pressures is to allow steam to pass from the steam pipe to the receiver in a manner so as to keep the receiver pressure at a predetermined figure.

DIAGRAM 5

*Link motion reversing gear position "forward"*

*Turbine control position, forward simple— Steam on*

This means that the locomotive is running in a forward direction with the reversing gear set to give a suitable piston valve travel, while the turbine is receiving steam only from the boiler, and the fluid coupling for forward running is rendered operative. This results in the cylinders and turbine working as separate power units, both giving maximum output to the driving wheels. The above results are obtained in the following manner.

The cam bar Y being positively connected to the reciprocating engine reversing gear, takes up a position that results in valves k and l being closed and valves j and m being open, so that steam from the boiler passes from the pipe line 43 to the valve a. The turbine control operates the shaft on which are mounted the cams A to H and the position of this shaft and its cams results in valves b, c, f and g being closed and valves a, d, e and h being open. Considering the cylinder 41, as the right hand side of this cylinder is always in communication with the boiler by pipe line 43 and the left hand side is in communication with the boiler through valves a and m and the pipe line 43 and due to the difference in areas of the sides of the piston, the frame 34 moves to the right. In the cylinder 42 the left hand side of the cylinder is in constant communication with the boiler by pipe 43 and the right hand side is open to atmosphere by the valve d, the frame 35 moves to the right. The result of the action of the cams mounted on the frames 34 and 35 is that valves q and r are closed, and valve p is open. This permits oil to circulate through the forward coupling, thus rendering it operative. The action of the frames 34 and 35 also causes valve t to shut and the valve s to open, this communicates the upper cavity of the relay valve 56, and the upper part of the relay valve 74 with the boiler through conduit 57 and pipe line 43. Consider the relay valve 56. The upper cavity is connected to the boiler, the cavity immediately under the main head of the moving part of the valve 56 is constantly connected with the boiler through pipe line 24, and the lower cavity of the valve is connected with the boiler through conduit 67, valve e and pipe 43. The result of these varying pressures is to place the moving part of valve 56 in such a position as to cause the right hand side of the piston 52 to be connected to atmosphere and as the left hand side of the piston is in constant connection with the boiler by pipe line 24, the valve 5 moves to the left, thus permitting the exhaust steam from the cylinder to pass to the locomotive blast pipe 3. Thus no exhaust steam enters the receiver.

Consider the relay valve 66, the upper cavity of the valve is connected to the boiler through conduit 67, valve e and pipe line 43 and the middle cavity is constantly connected with the boiler through pipe line 24. Thus the moving part falls and connects the right hand side of the piston 62 with the boiler through pipe 24, but the left hand side of the piston 62 is constantly connected with the boiler by pipe 24. Due to the difference of area of the sides of the piston 62 the valve 61 moves to the right and steam from the boiler passes by pipe 24 through port 71, valve 61, through conduit 72 to an annulus on valve 40. Consider the relay valve 74, here the upper cavity is connected to the boiler through conduit 57 and valve s and pipe line 43. The cavity immediately under the main piston head of the valve 74 is constantly connected to the boiler by pipe 24, and the lower cavity is open to atmosphere through conduit 77 and valve h. Thus the moving part of valve 74 takes up a position so as to connect the right hand side of the piston 172 with the boiler through pipe 24, and as the left hand side of the piston 172 is constantly connected with the boiler through pipe 24, and the areas of the sides of the piston are the same, then the valve 40 is free to float on the piston 172. Therefore, the steam from the boiler through pipe 24 and valve 61 passes to an annulus on valve 40, and as the steam in the receiver is acting upon the main head of the valve 40, the result of these pressures is to allow steam to pass from the boiler to the receiver in a manner so as to keep the receiver pressure at predetermined figure.

Diagram 6

Link motion reversing gear position "forward"

*Turbine control position, forward simple—Steam off*

This diagram should be taken as a subsidiary to Diagram 5, which provides the maximum power possible of the locomotive, in that should the driver consider that the engine is developing too much power for his requirement, he can move the turbine control to the position set out in Diagram 6, which will shut off the steam supply to the turbine without disconnecting the fluid drive, so that in the event of him requiring to boost the locomotive again all that is required is to supply steam to the turbine. The above results are obtained in the following manner.

The cam bar Y being positively connected to the reciprocating engine reversing gear, takes up a position that results in valves k and l being closed and valves j and m being open, so that steam from the boiler passes from the pipe line 43 to the valve a. The turbine control operates the shaft on which are mounted the cams A to H and the position of this shaft and its cams results in valves b, c, f and h being closed and valves a, d, e and g being open. Considering the cylinder 41, as the right hand side of this cylinder is always in communication with the boiler by pipe line 43 and the left hand side is in communication with the boiler through valves a and m and the pipe line 43 and due to the difference in areas of the sides of the piston, the frame 34 moves to the right. In the cylinder 42 the left hand side of the cylinder is in constant communication with the boiler by pipe 43 and the right hand side is open to atmosphere by the valve d, the frame 35 moves to the right. The result of the action of the cams mounted on the frames 34 and 35 is that valves q and r are closed, and valve p is open. This permits oil to circulate through the forward coupling, thus rendering it operative. The action of the frames 34 and 35 also causes valve t to shut and the valve s to open, this communicates the upper cavities of the relay valves 56 and 74 with the boiler through pipe line 43. Consider the relay valve 56. The upper cavity is connected to the boiler, the cavity immediately under the main head of the moving part of the valve is constantly connected with the boiler through pipe line 24, and the lower cavity of the valve is connected with the boiler through conduit 67, valve e and pipe 43. The result of these varying pressures is to place the moving part of valve 56 in such a position as to cause the right hand side of the piston 52 to be connected to atmosphere and as the left hand side of the piston 52 is in constant connection with the boiler by pipe line 24, the valve 5 moves to the left, thus permitting the exhaust steam from the cylinder to pass to the locomotive blast pipe 6. Thus no exhaust steam enters the receiver.

Consider the relay valve 66, the upper cavity of the valve is connected to the boiler through valve e and pipe line 43 and the middle cavity is constantly connected with the boiler through pipe line 24. Thus the moving part of valve 66 falls and connects the right hand side of the piston 62 with the boiler through pipe 24, but the left hand side of the piston 62 is constantly connected with the boiler by pipe 24. Due to the difference of area of sides of the piston 62 the valve 61 moves to the right and steam from the boiler passes by pipe 24, conduit 71, through valve 61 to an annulus on valve 40. Considering the valve 74, the upper cavity is connected to the boiler by valve s and pipe 43. The cavity immediately under the main head of the moving part is constantly connected with the boiler through pipe line 24, and the lower cavity is connected to the boiler through conduit 77, valve g and pipe line 43. The result of these varying pressures is that the right hand side of the piston 172 is connected to the atmosphere and as the left hand side of this piston is constantly connected to the boiler through pipe line 24, the valve 40 moves to the left, which cuts off the supply of steam from the boiler through pipe 24 and valve 61 from the receiver.

DIAGRAM 7

*Link motion reversing gear position "forward"*

*Turbine control position—Backward compound*

This diagram has been prepared to illustrate the interlock between the direction control which is operated by the cam bar linked to the cylinder reversing gear and the turbine control which is manually operated. Should the driver place the cylinder reversing gear in a forward direction, and the turbine control in a backward position, then due to the interlock the steam supply to the turbine is completely cut off and the fluid drive disconnected, thus making it impossible for the two power units to act against each other. The above results are obtained in the following manner. The cam bar Y being positively connected to the reciprocating engine reversing gear, takes up a position that results in valves $k$ and $l$ being closed and valves $j$ and $m$ being open, so that steam from the boiler passes from the pipe line 43 to the valve $a$. The turbine control operates the shaft on which are mounted the cams A to H and the position of this shaft and its cams results in valves $a$, $d$, $e$ and $g$ being closed and valves $b$, $c$, $f$ and $h$ being open.

Considering the cylinder 41, as the right hand side of this cylinder is always in communication with the boiler by pipe line 43 and the left hand side is in communication with the atmosphere through valve $b$, the frame 34 moves to the left, and in the cylinder 42 the left hand side of the cylinder is in constant communication with the boiler by pipe 43 and the right hand side is open to atmosphere by the valves $c$ and $j$, the frame 35 moves to the right. The result of the action of the cams mounted on the frames 34 and 35 is that valves $p$ and $r$ are shut and valve $q$ is open. This permits oil to pass from the delivery pump to the sump without passing through either of the fluid couplings. The action of the frames 34 and 35 also causes the valve $s$ to shut and the valve $t$ to open. This communicates through conduit 57 the upper cavity of the relay valve 56 and the upper part of the relay valve 74 to the atmosphere.

Consider the relay valve 56, the upper cavity is connected to atmosphere, the cavity immediately under the main head of the moving part of the valve is constantly connected with the boiler through pipe 24, and the lower cavity of the valve is connected with the atmosphere through conduit 67 and valve $f$. The result of these varying pressures is to place the moving part of valve 56 in such a position as to cause the right hand side of the piston 52 to be connected to atmosphere, and as the left hand side of the piston 52 is in constant connection with the boiler by pipe line 24 the valve 5 moves to the left, thus permitting the exhaust steam from the cylinder to pass to the locomotive blast pipe 6. Thus no exhaust steam enters the receiver.

Consider the relay valve 66, the upper cavity of this valve is connected to the atmosphere through conduit 67 and valve $f$ and the middle cavity is constantly connected with the boiler through pipe line 24, thus the moving part of valve 66 rises and connects the right hand side of the piston 62 with the atmosphere, but the left hand side of the piston 62 is constantly connected with the boiler by pipe 24. Thus valve 61 moves to the left, and the steam from the steam pipe passes by pipe 70 through valve 61 to an annulus on valve 40.

Consider the relay valve 74, here the upper cavity is open to atmosphere through the valve $t$, the cavity immediately under the main piston head of the moving part of valve 74 is constantly connected with the boiler by pipe 24, and the lower cavity is open to atmosphere through conduit 77 and valve $h$, thus the moving part takes up a position so as to connect the right hand side of the piston 172 with the atmosphere and as the left hand side of the piston 172 is constantly connected with the boiler through pipe 24, the valve 40 moves to the left; thus stopping the steam from the steam pipe 70 that passes through valve 61 from getting to the receiver.

Thus it is found that no steam can reach the receiver, so that the turbine does not operate, and also that no oil reaches the fluid couplings, so that the turbine is not connected with the driving wheels. Thus the reciprocating cylinders alone drive the locomotive.

DIAGRAM 8

*Link motion reversing gear position "forward"*

*Turbine control position backward, simple, steam on*

This diagram has been prepared to illustrate the interlock between the directional control which is operated by the cam bar linked to the cylinder reversing gear and the turbine control which is manually operated. Should the driver place the cylinder reversing gear in a forward direction, and the turbine control in a backward position, then due to the interlock the steam supply to the turbine is completely cut off and the fluid drive disconnected, thus making it impossible for the two power units to act against each other. The above results are obtained in the following manner.

The cam bar Y being positively connected to the reciprocating engine reversing gear, takes up a position that results in valves $k$ and $l$ being closed and valves $j$ and $m$ being open, so that steam from the boiler passes from the pipe line 43 to the valve $a$. The turbine control operates the shaft on which are mounted the cams A to H and the position of this shaft and its cams results in valves $a$, $d$, $f$ and $g$ being closed and valves $b$, $c$, $e$ and $h$ being open. Considering the cylinder 41, as the right hand side of this cylinder is always in communication with the boiler by pipe line 43 and the left hand side is in communication with the atmosphere through valve $b$, the frame 34 moves to the left, and in the cylinder 42 the left hand side of the cylinder is in constant communication with the boiler by pipe 43 and the right hand side is open to atmosphere by the valves $c$ and $j$, the frame 35 moves to the right. The result of the action of the cams mounted on the frames 34 and 35 is that valves $p$ and $r$ are shut and valve $q$ is open. This permits oil to pass from the delivery pump to the sump without passing through either of the fluid couplings. The action of the frames 34 and 35 also causes the valve $s$ to shut and the valve $t$ to open. This communicates the upper cavity of the relay valve 56 and the upper part of the relay valve 74 to the atmosphere through conduit 57.

Consider relay valve 56, the upper cavity is connected to atmosphere, the cavity immediately under the main head of the moving part of the valve 56 is constantly connected with the boiler through pipe 24, and the lower cavity of the valve is connected with the boiler through conduit 67, valve e and pipe 43. The result of these varying pressures is to place the moving part of valve 56 in such a position as to cause the right hand side of the piston 52 to be connected to atmosphere, and as the left hand side of the piston 52 is in constant connection with the boiler by pipe line 24 and the valve 5 moves to the left, thus permitting the exhaust steam from the cylinder to pass to the locomotive blast pipe 6. Thus no exhaust steam enters the receiver.

Consider the relay valve 66, the upper cavity of the valve is connected to the boiler through conduit 67 and valve e and pipe line 43 and the middle cavity is constantly connected with the boiler through pipe line 24. Thus the moving part of valve 40 falls and connects the right hand side of the piston 62 with the boiler through pipe 24, but the left hand side of the piston 62 is constantly connected with the boiler by pipe 24. Due to the difference of areas of the sides of the piston 62 the valve 61 moves to the right and steam from the boiler passes by pipe 24 through valve 61 to an annulus on valve 40.

Consider the relay valve 74, here the upper cavity is open to atmosphere through conduit 57 and the valve t, the cavity immediately under the main piston head of the moving part of valve 74 is constantly connected with the boiler by pipe 24, and the lower cavity is open to atmosphere through conduit 77 and valve h, thus the moving part of valve 74 takes up a position so as to connect the right hand side of the piston 172 with the atmosphere and as the left hand side of the piston 172 is constantly connected with the boiler through pipe 24, the valve 40 moves to the left; thus stopping the steam from the boiler through pipe 24 that passes through valve 61 from getting to the receiver.

Thus it is found that no steam can reach the receiver, so that the turbine does not operate, and also that no oil reaches the fluid couplings, so that the turbine is not connected with the driving wheels. Thus the reciprocating cylinders alone drive the locomotive.

DIAGRAM 9

*Link motion reversing gear position "forward"*

*Turbine control position backward T simple steam off*

This diagram has been prepared to illustrate the interlock between the directional control which is operated by the cam bar linked to the cylinder reversing gear and the turbine control which is manually operated. Should the driver place the cylinder reversing gear in a forward direction, and the turbine control in a backward position, then due to the interlock the steam supply to the turbine is completely cut off and the fluid drive disconnected, thus making it impossible for the two power units to act against each other. The above results are obtained in the following manner.

The cam bar Y being positively connected to the reciprocating engine reversing gear, takes up a position that results in valves k and l being closed and valves j and m being open, so that steam from the boiler passes from the pipe line 43 to the valve a. The turbine control operates the shaft on which are mounted the cams A to H and the position of this shaft and its cams results in valves a, d, f and h being closed and valves b, c, e and g being open.

Considering the cylinder 41, as the right hand side of this cylinder is always in communication with the boiler by pipe line 43 and the left hand side is in communication with the atmosphere through valve b the frame 34 moves to the left, and in the cylinder 42 the left hand side of the cylinder is in constant communication with the boiler by pipe 43 and the right hand side is open to atmosphere by the valves c and j, the frame 35 moves to the right. The result of the action of the cams mounted on the frames 34 and 35 is that valves p and r are shut and valve q is open. This permits oil to pass from the delivery pump to the sump without passing through either of the fluid couplings. The action of the frames 34 and 35 also causes the valve s to shut and the valve t to open. This communicates the upper cavity of the relay valve 56 and the upper part of the relay valve 74 to the atmosphere through conduit 57.

Consider relay valve 56, the upper cavity is connected to atmosphere, the cavity immediately under the main head of the moving part of the valve 56 is constantly connected with the boiler through pipe 24, and the lower cavity of the valve is connected with the boiler through conduit 67 and valve e. The result of these varying pressures is to place the moving part in such a position as to cause the right hand side of the piston 52 to be connected to atmosphere, and the left hand side of the piston 52 is in constant connection with the boiler by pipe line 24, and the valve 5 moves to the left, thus permitting the exhaust steam from the cylinder to pass to the locomotive blast pipe 6. Thus no exhaust steam enters the receiver.

Consider the relay valve 66, the upper cavity of the valve is connected to the boiler through conduit 67 and valve e and pipe line 43 and the middle cavity is constantly connected with the boiler through pipe line 24. Thus the moving part of valve 66 falls and connects the right hand side of the piston 62 with the boiler through pipe 24, but the left hand side of the piston 62 is constantly connected with the boiler by pipe 24. Due to the difference of area of the sides of the piston 62, the valve 61 moves to the right and steam from the boiler passes by pipe 24 through valve 61 to an annulus on valve 40.

Considering valve 74, the upper cavity is connected to the atmosphere through conduit 57, valve t and the cavity immediately below the head of the moving part 74 is in constant connection with the boiler through pipe line 24. The lower cavity of the valve is connected to the boiler through valve g and pipe line 43, the resultant action of the steam in this valve causes the right hand side of the piston 172 to be connected with the atmosphere, and as the left hand side of this piston is constantly connected to the boiler through pipe line 24, the valve 40 moves to the left, which cuts off the supply of steam from the boiler through pipe 24 and valve 61 from the receiver.

Thus it is found that no steam can reach the receiver, so that the turbine does not operate, and also that no oil reaches the fluid couplings, so that the turbine is not connected with the driving wheels. Thus the reciprocating cylinders alone drive the locomotive.

DIAGRAM 10

*Link motion reversing gear position "backward"*

*Turbine control position—Backward compound*

This means that the locomotive is running in a backward direction with the reversing gear set to give a suitable piston valve travel, while the turbine is receiving exhaust steam from the cylinders, boosted to a predetermined pressure, and the fluid coupling for backward running is rendered operative. This results in the cylinders and the turbine working in compound and both driving the locomotive. The above results are obtained in the following manner.

The cam bar Y being positively connected to the reciprocating engine reversing gear, takes up a position that results in valves *j* and *m* being closed and valves *k* and *l* being open, so that steam from the boiler passes from the pipe line 43 to the valve *c*. The turbine control operates the shaft on which are mounted the cams A to H, and the position of this shaft and its cams results in valves *a, d, e* and *g* being closed and valves *b, c, f* and *h* being open.

Considering the cylinder 41, as the right hand side of this cylinder is always in communication with the boiler by pipe line 43 and the left hand side is in communication with the atmosphere through valve *b*, the frame 34 moves to the left. In the cylinder 42 the left hand side of the cylinder is in constant communication with the boiler by pipe 43 and the right hand side is in communication with the boiler through valves *c* and *k* and pipe 43, communication with the boiler through valves *c* and *k* and pipe 43, and due to the difference in areas, the frame 35 moves to the left. The result of the action of the cams mounted on the frames 34 and 35 is that valves *p* and *q* are closed and valve *r* is open. This permits oil to circulate through the backward coupling, thus rendering it operative. The action of the frames 34 and 35 also causes valve *t* to shut and the valve *s* to open; this communicates the upper cavity of the relay valve 56 and the upper part of the relay valve 74 with the boiler through pipe line 43 and conduit 57.

Consider relay valve 56, the upper cavity is connected to the boiler, the cavity immediately under the main head of the moving part is constantly connected with the boiler through pipe 24, and the lower cavity of the valve is connected with the atmosphere through conduit 67 and the valve *f*. The result of these varying pressures is to place the moving part of valve 56 in such a position as to cause the right hand side of the piston 52 to be connected to the boiler through pipe 24, as the left hand side of the piston 52 is in connection with the boiler by pipe line 24, the valve 5 moves to the right, thus permitting the exhaust steam from the cylinder to pass to the receiver, and the exhaust from the turbine to pass to the locomotive blast pipe 6. Thus the turbine is supplied with exhaust steam from the cylinders.

Consider the relay valve 66, the upper cavity of this valve is connected to the atmosphere through conduit 67 and valve *f*, and the middle cavity is constantly connected with the boiler through pipe line 24, thus the moving part of valve 66 rises and connects the right hand side of the piston 62 with the atmosphere but the left hand side of the piston 62 is constantly connected with the boiler by pipe 24. Thus the valve 61 moves to the left and steam from the steam pipe passes by pipe 70 through valve 61 to an annulus on valve 40.

Consider the relay valve 74, here the upper cavity is connected to the boiler through conduit 57 and valve *s* and pipe line 43. The cavity immediately under the main piston head of the moving part of valve 74 is constantly connected to the boiler by pipe 24, and the lower cavity is open to atmosphere through conduit 77 and valve *h*. Thus the moving part of valve 74 takes up a position so as to connect the right hand side of the piston 172 with the boiler through pipe 24, and as the left hand side of the piston 172 is constantly connected with the boiler through pipe 24, and the areas of the sides of the piston are the same, then the valve 40 is free to float on the piston 172. Therefore the steam from the steam pipe through pipe 70 and valve 61 passes to an annulus on valve 40, and the steam in the receiver is acting upon the main head of the valve 40. The result of these pressures is to allow steam to pass from the steam pipe to the receiver in a manner so as to keep the receiver pressure at a predetermined figure.

DIAGRAM 11

*Link motion reversing gear position "backward"*

*Turbine control position backward turbine simple—Steam on*

This means that the locomotive is running in a backward direction with the reversing gear set to give a suitable piston valve travel, while the turbine is receiving steam only from the boiler, and the fluid coupling for backward running is rendered operative. This results in the cylinders and turbine working as separate power units, both giving maximum output to the driving wheels. The above results are obtained in the following manner.

The cam bar Y being positively connected to the reciprocating engine reversing gear, takes up a position that results in valves *j* and *m* being closed and valves *k* and *l* being open, so that steam from the boiler passes from the pipe line 43 to the valve *c*. The turbine control operates the shaft on which are mounted the cams A to H and the position of this shaft and its cams results in valves *a, d, f* and *g* being closed and valves *b, c, e* and *h* being open.

Considering the cylinder 42 as the left hand side of this cylinder is always in communication with the boiler by pipe line 43 and the right hand side is in communication with the boiler through valves *c* and *k* and the pipe line 43 and due to the difference in areas of the sides of the piston, the frame 35 moves to the left. In the cylinder 41 the right hand side of the cylinder is in constant communication with the boiler by pipe 43 and the left hand side is open to atmosphere by the valve *b*, the frame 34 moves to the left. The result of the action of the cams mounted on the frames 34 and 35 is that valves *p* and *q* are closed, and valve *r* is open. This permits oil to circulate through the backward coupling, thus rendering it operative. The action of the frames 34 and 35 also causes valve *t* to shut and the valve *s* to open; this communicates the upper cavity of the relay valve 56, and the upper part of the relay valve 74 with the boiler through pipe line 43 and conduit 57.

Consider the relay valve 56. The upper cavity is connected to the boiler, the cavity immediately under the main head of the moving part of the valve 56 is constantly connected with the boiler through pipe line 24, and the lower cavity of the valve is connected with the boiler through conduit 67 and valve e and pipe 43. The result of these varying pressures is to place the moving part of valve 56 in such a position as to cause the right hand side of the piston 52 to be connected to atmosphere and as the left hand side of the piston 52 is in constant connection with the boiler by pipe line 24, the valve 5 moves to the left, thus permitting the exhaust steam from the cylinder to pass to the locomotive blast pipe 6. Thus no exhaust steam enters the receiver.

Consider the relay valve 66, the upper cavity of the valve is connected to the boiler through conduit 67 and valve e and pipe line 43 and the middle cavity is constantly connected with the boiler through pipe line 24. Thus the moving part of valve 66 falls and connects the right hand side of the piston 62 with the boiler through pipe 24 but the left hand side of the piston 62 is constantly connected with the boiler by pipe 24. Due to the difference of areas of the sides of the piston 62 the valve 61 moves to the right and steam from the boiler passes by pipe 24 through valve 61 to an annulus on valve 40.

Consider the relay valve 74, here the upper cavity is connected to the boiler through conduit 57, valve s and pipe line 43. The cavity immediately under the main piston head of the valve 74 is constantly connected to the boiler by pipe 24, and the lower cavity is open to atmosphere through conduit 77 and valve h. Thus the moving part of valve 74 takes up a position so as to connect the right hand side of the piston 172 with the boiler through pipe 24, and as the left hand side of the piston 172 is constantly connected with the boiler through pipe 24, and the areas of the piston are the same, then the valve 40 is free to float on the piston 172. Therefore, the steam from the boiler through pipe 24 and valve 61 passes to an annulus on valve 40, and as the steam in the receiver is acting upon the main head of the valve 40. The result of these pressures is to allow steam to pass from the boiler to the receiver in a manner so as to keep the receiver pressure at a predetermined figure.

I claim:—

1. A steam locomotive comprising a reciprocating engine having a blast pipe, a reversing gear for said reciprocating engine, a steam turbine, valve means for passing the exhaust steam of said reciprocating engine alternately to said turbine or to the blast pipe, valve means for passing steam other than exhaust steam to said turbine, means for coupling the driving shaft of said turbine to the engine driven driving wheel of said locomotive, relay means for controlling said two valve means and said coupling means, means associated with the reversing gear for operating said relay means, and manually controlled means interposed between said relay means and said two valve means for selective operation of said two valve means.

2. In a steam locomotive, a reciprocating engine having a blast pipe, reversing gear for said reciprocating engine, an exhaust steam turbine, a receiver for steam adapted to receive exhaust steam from said reciprocating engine, valve means whereby the exhaust steam from said reciprocating engine may be passed to said receiver or to the blast pipe, valve means whereby said turbine may receive steam which has not passed through the cylinders of said reciprocating engine, a driving wheel, a coupling for coupling said turbine to said driving wheel, manually operable cam means, steam-operated relays for controlling said steam-controlling valve means, and steam-operated relays for controlling said coupling, controlling valves for said steam operated relays, cam means connected to said reversing gear for controlling some of said controlling valves, the remainder of said controlling valves being under the control of said manually operable cam means.

3. In a steam locomotive, the combination of a reciprocating engine, reversing gear for said reciprocating engine, a steam turbine, a driving wheel, a fluid coupling for connecting said turbine to said driving wheel, master valve means for allowing or preventing the supply of steam to said turbine, valve means for rendering said coupling operative or inoperative, common means for operating said master valve means and said coupling controlling valve means, fluid relay means for controlling said common operating means, a member operated by the reversing gear and acting in such operation to actuate said relay means, valve means for selectively controlling the supply to said turbine of steam from alternative sources, and manually controlled means interposed between the said common means, said master valve means and the last mentioned valve means for selective operation of both said valve means.

ALBERT REIDINGER.